(12) United States Patent  (10) Patent No.: US 8,215,478 B2
Almond  (45) Date of Patent: Jul. 10, 2012

(54) ADAPTABLE RECIPROCATING SLAT CONVEYOR

(75) Inventor: Thomas Michael Price Almond, Newcastle (AU)

(73) Assignee: Hallco Industries, Inc., Tillamook, OR (US)

( * ) Notice: Subject to any disclaimer, the term of this patent is extended or adjusted under 35 U.S.C. 154(b) by 219 days.

(21) Appl. No.: 12/604,279

(22) Filed: Oct. 22, 2009

(65) Prior Publication Data

US 2011/0042185 A1  Feb. 24, 2011

Related U.S. Application Data

(60) Provisional application No. 61/236,513, filed on Aug. 24, 2009.

(51) Int. Cl.
  *B65G 25/04* (2006.01)
  *B65G 25/00* (2006.01)
  *B65G 25/06* (2006.01)
(52) U.S. Cl. .................. 198/750.2; 198/750.5
(58) Field of Classification Search .......... None
  See application file for complete search history.

(56) References Cited

U.S. PATENT DOCUMENTS

| | | | |
|---|---|---|---|
| 3,534,875 A | 10/1970 | Hallstrom, Jr. | |
| 4,143,760 A | 3/1979 | Hallstrom | |
| 4,144,963 A | 3/1979 | Hallstrom | |
| 4,580,678 A | 4/1986 | Foster | |
| 4,793,468 A | 12/1988 | Hamilton et al. | |
| 4,856,645 A | 8/1989 | Hallstrom, Jr. | |
| 4,962,848 A | 10/1990 | Foster | |
| 5,839,568 A * | 11/1998 | Clark | 198/750.5 |
| 6,513,648 B1 | 2/2003 | Hallstrom et al. | |

OTHER PUBLICATIONS

International Searching Authority, International Search Report and Written Opinion for PCT/US10/47923, Nov. 23, 2010.
International Searching Authority, International Search Report and Written Opinion for PCT/US2011/025629, Feb. 21, 2011.
International Preliminary Examining Authority, International Preliminary Report on Patentability for PCT/US10/47923, Oct. 24, 2011.

* cited by examiner

*Primary Examiner* — Kavel Singh
(74) *Attorney, Agent, or Firm* — Law Office of Karen Dana Oster, LLC

(57) ABSTRACT

A multi-operating-mode reciprocating slat conveyor having a plurality of operating modes (each operating mode having a predetermined number of steps) and means for switching between operating modes responsive to at least one operating mode changing event.

31 Claims, 22 Drawing Sheets

ADAPTABLE RECIPROCATING SLAT CONVEYOR

The present application is an application claiming the benefit under 35 USC Section 119(e) of U.S. Provisional Patent Application Ser. No. 61/236,513, filed Aug. 24, 2009. The present application is based on and claims priority from this application, the disclosure of which is hereby expressly incorporated herein by reference in its entirety.

BACKGROUND OF INVENTION

The present invention is directed to a reciprocating slat conveyor and, more specifically, to an adaptable or multi-mode reciprocating slat conveyor.

Reciprocating slat-type conveyors (also referred to as "conveyor systems," "live floor conveyors," "reciprocating slat conveyors," or "conveyors") generally include a plurality of elongated slats (also referred to as "conveyor slats," "floor slats," or "deck slats"). The conveyors are generally used in the load-holding compartment of load transport vehicles (e.g. a mobile cargo trailer, bed of a truck (truck bed), rear portion of a semi-trailer, or container portion of a van-truck). The load-holding compartment has a front end toward the front of the compartment (e.g. in a truck the front end would be the end toward the driver compartment) and a back or rear end (e.g. in a truck the back end would be the end into which the load would be inserted and from which the load would be removed). The slats are arranged side-by-side to form the floor of the load-holding compartment so that they extend longitudinally to the framework of the load-holding compartment. A "load" may be, for example, silage, grain, fertilizer, soil, sand, shredded documents, chipped wood, sawdust, garbage, or any particulate matter.

The slats are generally grouped in groups of two or more slats (groups of n slats). Groups may also include one or more stationary slats. For the purpose of description, respective slats from each group will be referred to as a "set." The slats in each set move simultaneously in one direction (the "load-conveying direction" or "conveying direction") and then return (in the "load-retracting direction" or "retracting direction") to the beginning position. The slats' back and forth movement results in a step-wise advance of the load positioned on the floor followed by a retraction of the slats without moving the load. If a truck were being loaded, the load-conveying direction would be toward the front end of the load-holding compartment and the load-retracting direction would be toward the rear end of the load-holding compartment. If a truck were being unloaded (a more typical use), the load-conveying direction would be toward the rear end of the load-holding compartment and the load-retracting direction would be toward the front end of the load-holding compartment.

Reciprocating slat conveyors can be categorized based on the number of "steps" each group of slats performs in the load-retracting direction (e.g. if the slats in a three-slat group each retract individually, it is a three-step system, but if only two slats of a three-slat group retract, and the third is held in place, it is a two-step system. Another categorization is based on whether the loading/unloading motion is continuous (conveying motion by majority of slats doesn't stop moving the load while a minority retract) or non-continuous (conveying motion stops while each slat set retracts).

U.S. Pat. No. 4,856,645 to Hallstrom (which is herein incorporated-by-reference in its entirety) describes a two-step non-continuous reciprocating slat type conveyor that includes two longitudinally extending, laterally spaced apart, first and second sets of alternating slats arranged for longitudinal sliding movement on the plane of the bed. Interposed between adjacent reciprocating slats is a third fixed slat mounted immovably to the framework. A pair of double-acting hydraulic cylinders are provided to move the sets of reciprocative slats longitudinally, the first set of reciprocative slats being connected to the first cylinder and the second set being connected to the second cylinder, so that adjacent reciprocative slats are able to move independently of each other while every other reciprocative slat operates in unison off the same drive, whereby both sets of reciprocative slats can be moved in the conveying direction simultaneously, and each set of reciprocative slats can be moved in the opposite, retracting direction independently of the other.

U.S. Pat. No. 4,962,848 to Foster (which is herein incorporated-by-reference in its entirety) describes a two-step non-continuous reciprocating floor conveyor that includes groups having two movable floor members and a third fixed, immovable floor member. The primary difference between the invention described in the Foster patent and the invention described in U.S. Pat. No. 4,856,645 to Hallstrom is in the location of the moving floor members in relation to the fixed, immovable floor member.

U.S. Pat. No. 3,534,875 to Hallstrom (which is herein incorporated-by-reference in its entirety) describes a three-step continuous reciprocating slat-type conveyor. In the Hallstrom '875 patent, groups of at least three elongated slats are arranged side by side to form a conveyor-type truck bed. The slats of each group are connected to a drive mechanism in such a manner that there are always a greater number of slats of each group moving simultaneously in the conveying direction while the remaining slat or slats of the group move in the opposite, retracting direction. Drive means are included that are operable to move more than half of the number of slat members of each group simultaneously in a conveying direction and to move the remainder of the slats of each group in the opposite direction at a higher rate of speed. For example, the Hallstrom '875 patent describes an embodiment in which there are two sets of slats conveying and one set of slats retracting.

U.S. Pat. No. 4,143,760 to Hallstrom (which is herein incorporated-by-reference in its entirety) describes a three-step non-continuous reciprocating slat-type conveyor in which the slats are connected to a fluid pressure drive mechanism that is operable to move all of the slats of each group from a start position simultaneously in a load-conveying direction and then to move the slats of each group sequentially (in sets of respective slats) in the opposite, retracting direction from the advanced position back to the start position. The slats of each group are interengaged releasably in the conveying direction to ensure simultaneous movement.

U.S. Pat. No. 4,793,468 to Hamilton (which is herein incorporated-by-reference in its entirety) describes an apparatus, and a related method, for controlling a four-step continuously moving floor having multiple sliding slats, to produce a practically uniform load-moving force on a load carried on the apparatus. The slats are reciprocated back and forth by hydraulic cylinders, each of which controls a set of slats that are moved together. At any given time, a majority of slats is moving together in the desired direction, and carrying a load in this direction at a nearly uniform velocity. The remainder of the slats is moved in a reverse direction, but at a speed that is a multiple of the forward speed of the majority of the slats. Each set of slats is moved through a forward stroke at a relatively low speed; then through a backward stroke at a higher speed.

U.S. Pat. No. 4,580,678 to Foster (which is herein incorporated-by-reference in its entirety) describes a six-step continuously moving conveyor that uses two separate sources of hydraulic pressure, one for advancing the floor slat members and another for retracting the floor slat members. A majority of the floor is always moving in the conveying direction while a minority of the floor is being retracted at a greater rate of speed.

BRIEF SUMMARY OF THE INVENTION

The present invention is directed to a reciprocating slat conveyor and, more specifically, to an adaptable or multi-mode reciprocating slat conveyor.

A multi-operating-mode reciprocating slat conveyor includes a plurality of slats arranged in groups (the slats being movable in a load-conveying direction and a load-retracting direction) and one slat of each group is preferably attached to at least one power source (or sub-power unit). The multi-operating-mode reciprocating slat conveyor has a plurality of operating modes (at least one of which is an initial operating mode), each operating mode having a predetermined number of steps for moving a predetermined number of slats in each group of slats in the load-retracting direction. At least one of the plurality of operating modes is an initial operating mode. The multi-operating-mode reciprocating slat conveyor has a means for switching to a new operating mode, the means for switching being responsive to at least one operating mode changing event.

A multi-operating-mode reciprocating slat conveyor for loading and unloading at least one load from a load-holding compartment includes a plurality of slats arranged in groups of n slats (n being a number greater than or equal to three (3)) and n power sources. The slats are movable in a load-conveying direction and a load-retracting direction. One slat of each group attached to each power source (or sub-power unit). The multi-operating-mode reciprocating slat conveyor has a plurality of operating modes, each operating mode having a predetermined number of steps for moving a predetermined number of slats in each group of slats in the load-retracting direction. The multi-operating-mode reciprocating slat conveyor has a means for switching between operating modes, the means for switching responsive to at least one operating mode changing event.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

The accompanying drawings, which are incorporated in and constitute a part of this specification, illustrate various exemplary embodiments.

DETAILED DESCRIPTION OF THE INVENTION

Figure 1:
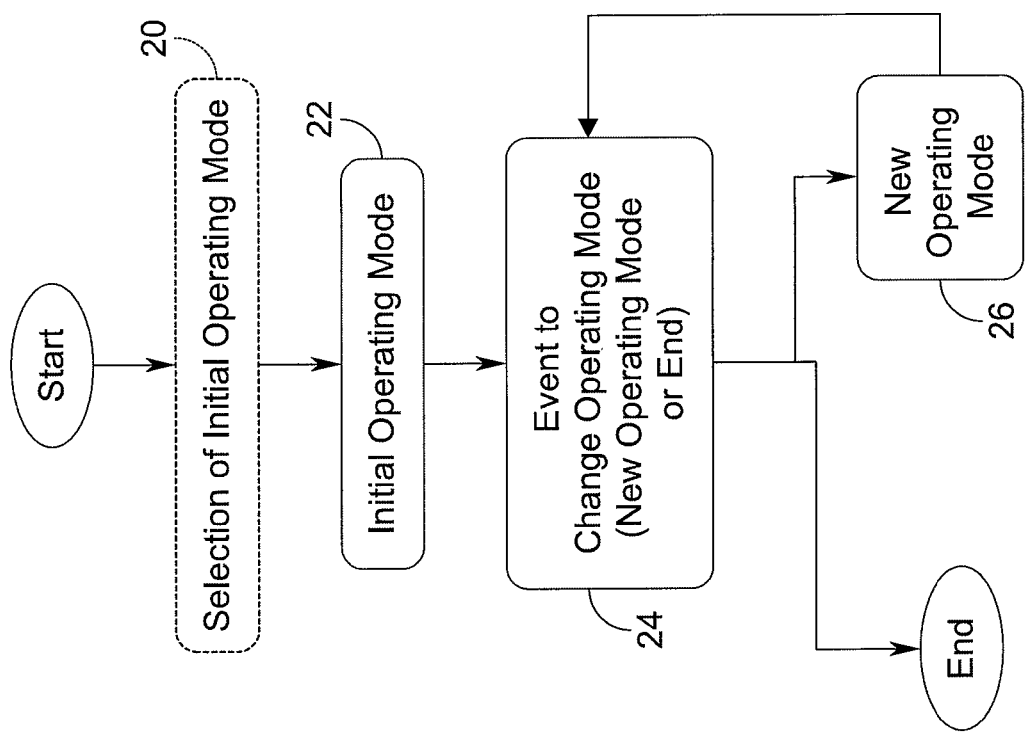
FIG. 1 is a flow chart showing an exemplary method and system of an adaptable or multi-mode reciprocating slat conveyor.

The present invention is directed to a reciprocating slat conveyor and, more specifically, to an adaptable or multi-mode (also referred to as a multi-operating-mode) reciprocating slat conveyor.

As set forth in the Background section of this disclosure, there are many different types of reciprocating slat conveyors. The known reciprocating slat conveyors can be categorized based on the number of "steps" each group of slats performs in the load-retracting direction (e.g. if each slat in a three-slat group retracts individually, it is a three-step system). Exemplary reciprocating slat conveyors with two, three, four, and six steps are discussed in the Background section of this disclosure. The known reciprocating slat conveyors can further be categorized based on whether the slat movement is continuous or non-continuous, and examples of both of these are discussed in the Background section of this disclosure.

There may be advantages to each of the prior art systems regardless of how many steps are performed in the load-conveying direction or whether the slat movement is continuous or non-continuous. For example, of the known prior art systems, two-step reciprocating slat conveyors are generally the quickest and most efficient (in terms of oil or power use). For example, less hydraulic oil is required to convey the load 30 using a two-step reciprocating slat conveyor. So for the same volume of hydraulic oil, the two-step reciprocating slat conveyor will convey at a faster rate than the three-step reciprocating slat conveyor. Two-step reciprocating slat conveyors, however, are non-continuous, and at least one slat in each group does not move. The problem with one slat not moving is that there may be load material that is not removed from the load-holding compartment (poor "clean-out"). Reciprocating slat conveyors with higher numbers of steps and/or continuous movement have more power and provide better clean-out, but are less efficient and generally slower. Also, different types of reciprocating slat conveyors are particularly suitable for particular loads. For example, a two-step reciprocating slat conveyor is particularly suited for loads that are cohesive (e.g. silage and shredded documents). Reciprocating slat conveyors having three and more steps are particularly suited for loads that are less cohesive (e.g. grain and fertilizer). Accordingly, all of the prior art systems have their strengths and weaknesses.

The adaptable or multi-mode reciprocating slat conveyor, however, is able to function in multiple step modes (e.g. both a two-step mode and a three-step mode, but could be any modes having a predetermined number of steps) and either in a continuous or a non-continuous mode and, therefore, has all the advantages of the various prior art reciprocating slat conveyors. The adaptable reciprocating slat conveyor could be used in any of the operating modes it is designed to support so that a user could pick the best operating mode for a particular use. Further, the user could choose an initial operating mode (characterized by having a predetermined number of steps) and then switch to a new operating mode (characterized by having a different predetermined number of steps than the initial operating mode). The ability to switch between operating modes would be particularly advantageous when the load is a "sticky" load in that there is a lot of friction with the side walls such that at first the load is difficult to unload. In such a situation, the initial operating mode might be a three-step operating mode and, once the load has been "unstuck," either a sensor 40 or a user could initiate a change in the operating mode to a more efficient and faster two-step operating mode. Similarly, if a load is particularly heavy, a more powerful (more cylinders are at work) three-step operating mode may be used until the load is lighter, at which time either a sensor 40 or a user can initiate a change in the operating mode to a more efficient and faster two-step non-continuous operating mode.

For purposes of the adaptable reciprocating slat conveyor, an operating mode is defined by the number of steps it uses (i.e. the predetermined number of steps). A characteristic of the operating mode is whether it is continuous and non-continuous. For purposes of the adaptable reciprocating slat conveyor, switching between a continuous operating mode and a non-continuous operating mode would still be considered switching between operating modes. It should be noted that "on" and "off" are not considered operating modes. Further, although reversing the direction of a reciprocating slat conveyor (e.g. switching from loading to unloading or switching from unloading to loading) may be accompanied by a change in operating mode, the direction itself is not considered in the description of the operating mode. For purposes of the adaptable reciprocating slat conveyor, switching between an "on" state and an "off" state would not be considered switching between operating modes. Similarly, for purposes of the adaptable reciprocating slat conveyor, switching between a "loading" state and an "unloading" state would not be considered switching between operating modes.

FIG. 1 is a flow chart showing an exemplary method and system related to the adaptable reciprocating slat conveyor. This chart shows that when a reciprocating slat conveyor is turned on (start) it optionally allows the selection of an initial operating mode 20 (alternatively, the reciprocating slat conveyor can enter into a predetermined operating mode). If a selection of the initial operating mode is facilitated, the selection may be made by the user manually or it may be made automatically using one or more sensors. The reciprocating slat conveyor enters into an initial operating mode (e.g. two-step non-continuous or three-step continuous) 22. At some point, an event (an operating mode changing event) occurs that changes the operating mode 24, and the reciprocating slat conveyor enters into a new operating mode 26. For example, a user can initiate the change (e.g. manual operating mode changing event), a sensor can initiate the change (e.g. sensor operating mode changing event), the mode can change after a number of cycles (e.g. a counting mode changing event), or a timer can initiate the change (e.g. timing operating mode changing event) so that a reciprocating slat conveyor that is initially in the two-step non-continuous mode enters into a three-step continuous mode. In another example, an operating mode changing event occurs so that a reciprocating slat conveyor that is initially in the three-step continuous mode enters into a two-step non-continuous mode. Multiple operating mode changing events can occur to change the operating mode. For example, the initial operating mode might be a six-step operating mode, and events can occur such that it operates sequentially in five-step, four-step, three-step, and eventually two-step operating modes. In yet another example, the initial operating mode may be a two-step operating mode because it is economical, but a user might observe that the load is too heavy and change it to a three-step operating mode and, thereafter, return to the two-step operating mode when the load is lighter. Eventually, the reciprocating slat conveyor is turned off (end), although this is not technically an operating mode changing event because it does not cause a change between two operating modes ("on and off" and "loading and unloading" are not technically operating modes).

Figure 2:
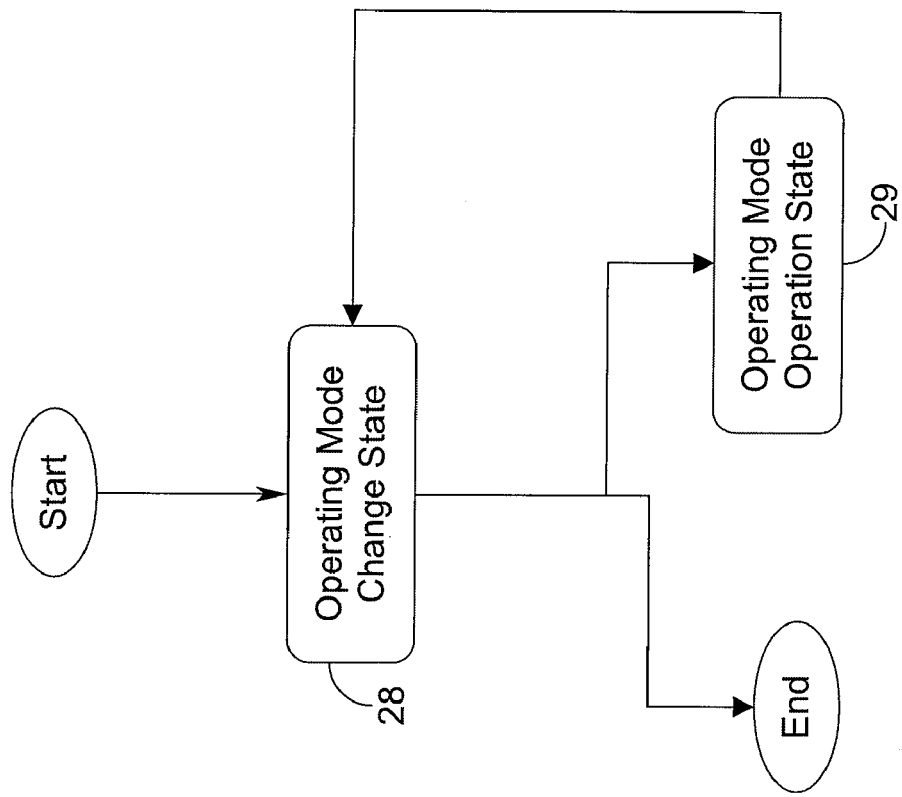
FIG. 2 is a state chart showing an exemplary simplified version of the states of an adaptable or multi-mode reciprocating slat conveyor.

FIG. 2 is a state chart showing an exemplary simplified version of the states of an adaptable or multi-mode reciprocating slat conveyor. State 28 is an operating mode change state. In this state the multi-mode reciprocating slat conveyor is either waiting for instructions for change and/or actually changing states in response to an operating mode changing event. Exemplary operating mode changing events include, but are not limited to, predetermined selection of an operating mode (e.g. an initial operating mode entered into as a result of a predetermined mechanical configuration and/or program), user or manual selection or triggering of an operating mode (e.g. the user selecting the operating mode or changing to the operating mode), sensor selection or triggering of an operating mode (e.g. a sensor triggering a change of operating mode), timing selection or triggering of an operating mode (e.g. after a predetermined time the operating mode changes), or other selection or triggering means of a change in operating modes. State 29 is the state in which the multi-mode reciprocating slat conveyor is actually running in the operating mode. It should be noted that prior art (which can be considered to have only a single operating mode) does not have an operating mode change state—it is either on or off and, if it is on, it is either loading or unloading. On, off, loading, and unloading are not relevant to operating mode as defined herein.

It should be noted that FIGS. 1 and 2 are charts that illustrate methods and systems related to the adaptable reciprocating slat conveyor. It will be understood that each block of these charts, and combinations of blocks in these charts, may be implemented as part of a mechanical system (e.g. in the shown hydraulic system of FIG. 3). It will also be understood that at least some of the blocks of these charts, parts of the blocks of these charts, and/or combinations of blocks in these charts, may be implemented by computer program instructions receiving instructions from a user and/or sensors 40 associated with a mechanical system. These computer program instructions may be loaded onto a computer to produce a machine, such that the instructions that execute on the computer create structures for implementing the functions specified in the chart block or blocks. The term "loaded onto a computer" also includes being loaded into the memory of the computer or a memory associated with or accessible by the computer. The term "memory" is meant to include any type of computer (or other technology)-readable medium including, but not limited to, RAM, ROM, floppy disks, hard disks, or other storage media known or yet to be discovered. The term "computer" is meant to include any type of processor, programmable logic device, or other type of programmable apparatus known or yet to be discovered. It will also be understood that each block of the charts, and combinations of blocks in the charts, may be divided and/or joined with other blocks of the charts without affecting the scope of the invention.

The adaptable reciprocating slat conveyor operates in a plurality of operating modes, each operating mode having a predetermined number of steps for moving a predetermined number of slats in each group of slats in said load-retracting direction. For example, an adaptable reciprocating slat conveyor can operate in two operating modes, one being a two-step non-continuous operating mode and one being a three-step non-continuous operating mode. A preferred exemplary adaptable reciprocating slat conveyor is shown and described in detail with the hydraulic schematic of FIG. 3 and the graphical representations of the various steps of both operating modes shown in FIGS. 4-21. It should be noted that this is meant to be an example of an adaptable or multi-mode reciprocating slat conveyor. Alternative adaptable reciprocating slat conveyors may have operating modes that differ from the two described (e.g. a two-step non-continuous operating mode and a six-step continuous operating mode), or have more than two operating modes (e.g. a two-step non-continuous operating mode, a three-step non-continuous operating mode, and a six-step non-continuous operating mode). Still further, as can be seen from the discussion of the prior art systems, there may be multiple types of two-step non-continuous operating modes, three-step continuous operating modes, and other known operating modes which differ, for example, in the sequence or speed of slat movement. The adaptable reciprocating slat conveyor could be designed to work in any combination of these modes. For example, the adaptable reciprocating slat conveyor may be designed only to include two different types of three-step continuous operating modes or two different types of three-step non-continuous operating modes.

Further, the mechanical structure of such components as the framework, slats, and seals may be as shown or may be more like those found in the prior art references discussed herein, other known prior art references, as well as known and yet to be developed mechanical structure components. Similarly, the power source(s) and/or cylinders of the adaptable reciprocating slat conveyor may be like those discussed in the references discussed herein, other known prior art references, as well as known and yet to be developed power source(s) and/or cylinders. Still further, although the exemplary power source(s) shown and discussed herein is based on hydraulics, alternative power sources could be based on pneumatics, electronics, or other known or yet to be developed systems.

In the description of FIGS. 3-21, the same terms and reference numbers will be used to refer to the same or like parts. For example, hydraulic cylinders HCa, HCb, and HCc (referred to generally as hydraulic cylinders HC), cross-drives CDa, CDb, CDc (referred to generally as cross-drives CD), and floor slats FSa, FSb, FSc (referred to generally as FS) are terms and reference numbers that are used throughout the figures to describe similar structures. Further, for the sake of readability, the modifiers (a, b, and c) have been kept consistent in describing the hydraulic cylinders HC, cross-drives CD, and floor slats FS such that like modifiers go together (e.g. hydraulic cylinder HCa is connected to cross-drive CDa which, in turn, is connected to floor slats FSa. It should be noted that valves V-A, V-B, V-C, and V-D and poppets Pa1, Pa2, Pb1, Pb2, Pb3, Pc1, and Pc2 do not follow the same modifier scheme. Where otherwise not specifically defined, words, phrases, abbreviations, and/or acronyms are given their ordinary meaning in the art. It should be noted that, unless otherwise specified, the term "or" is used in its non-exclusive form (e.g. "A or B" includes A, B, A and B, or any combination thereof, but it would not have to include all of these possibilities). It should be noted that, unless otherwise specified, "and/or" is used similarly (e.g. "A and/or B" includes A, B, A and B, or any combination thereof, but it would not have to include all of these possibilities). It should be noted that, unless otherwise specified, the term "includes" means "comprises" (e.g. a device that includes or comprises A and B contains A and B but optionally may contain C or additional components other than A and B). It should be noted that, unless otherwise specified, the singular forms "a," "an," and "the" refer to one or more than one, unless the context clearly dictates otherwise.

As shown in FIGS. 3-21, reciprocating slat-type conveyors 10 generally include a plurality of elongated floor slats FSa, FSb, FSc (also referred to as "conveyor slats," "slats," or "deck slats" and referred to generally as FS). Conveyor systems 10 are generally used in the load-holding compartment 12 of load transport vehicles. Exemplary load-holding compartments 12 include a mobile cargo trailer, a bed of a truck (truck bed), a rear portion of a semi-trailer, a cargo container, a container portion of a van-truck, stationary bins, or any mobile or stationary load holder. The load-holding compartments 12 have a framework that has a longitudinal direction and a transverse direction perpendicular to the longitudinal direction. Although the longitudinal direction is generally longer than the transverse direction, these terms are not meant to be so limited. In the figures the longitudinal direction is shown as extending from the front 14 to the rear 16. The slats FS (also referred to as FSa, FSb, FSc) are arranged side-by-side to form the floor of the load-holding compartment 12 so that they extend parallel to the longitudinal direction of the framework of the load-holding compartment 12. The design of the slats FS, including length, width, and thickness, depends upon factors including the dimensions of the floor, the construction material, and the application(s) for which the conveyor is to be used.

As shown in FIGS. 4-21, the slats FS are arranged in groups of slats (a group generally includes at least three slats FSa, FSb, FSc, although it is to be understood that each group may include any desired number in excess of two). Groups may also include one or more stationary slats. For purpose of description, respective slats from each group will be referred to as a "set" (e.g. a set of slats would be all the FSa slats). In one exemplary operating mode, the slats FSa, FSb, FSc move simultaneously in one direction (e.g. the "load-conveying direction"). Then the slats return in the opposite direction (e.g. the "retraction direction"). This may be accomplished by moving one slat FSa of each group (the FSa set) in the retraction direction, followed by another slat FSb of each group (the FSb set), and so on until all the slats (or the majority of the slats) of each group are retracted. It should be noted that alternative adaptable reciprocating slat conveyors may use alternative slat sequences shown and described in any of the references that are incorporated-by-reference herein. It should be noted that the present invention is not to be limited to adaptable reciprocating slat conveyors using these specific slat sequences. In principle, the floor slats FS move together, taking the load with them, and then the slats FS return to their starting position. In stages, with every third slat FSa, FSb, FSc (in an adaptable reciprocating slat conveyor with groups of three slats) moving in unison. The stationary slats (those not currently returning) at least partially hold the load 30 at least partially in place until the next cycle begins. This operation results in a step-wise advance (in the load-conveying direction) of a load positioned on the floor that may be followed by partial retraction of the load on the floor.

The shown adaptable reciprocating slat conveyor uses a hydraulically-powered conveyor system. In this shown adaptable reciprocating slat conveyor, a two-way, variable-speed, hydraulic power unit moves the floor slats FS and allows for controlled loading, unloading, and precision metering. In the shown adaptable reciprocating slat conveyor, the power source (power unit) includes three sub-power units shown as three double acting hydraulic cylinders HCa, HCb, and HCc (referred to generally as hydraulic cylinders HC). In the shown adaptable reciprocating slat conveyor, each hydraulic cylinder HCa, HCb, HCc includes a respective piston 18a, 18b, 18c (each including a shaft). The size, location, and number of sub-power units (e.g. hydraulic cylinders) of the power unit(s) depend(s) on the application(s) of the conveyor system and the specific operating modes to be implemented. Alternative adaptable reciprocating slat conveyors may be powered using one or more power sources including hydraulic power sources, pneumatic power sources, electrical power sources, internal combustion or other prime mover power sources, power sources shown and described in any of the references that are incorporated-by-reference herein, and power sources known or yet to be discovered. These power sources may also include mechanical linkage necessary to implement the adaptable reciprocating slat conveyor. Multiple sub-power units (n sub-power units) and/or multiple power sources (n power sources) may be used. It should be noted that the present invention is not to be limited to adaptable reciprocating slat conveyors powered using these power sources and structures.

The floor slats FS are connected to the hydraulic cylinders HC by connecting the pistons 18a, 18b, 18c (or extensions of the pistons) directly or indirectly to respective lateral drive-beams or cross-drives CDa, CDb, CDc (referred to generally as cross-drives CD) which are, in turn, connected to a plurality of floor slats FS. In preferred adaptable reciprocating slat conveyors, each hydraulic cylinder HC is connected to a respective cross-drive CD. Each movable floor slat FS is then connected to one cross-drive such that each movable floor slat FS in a group is connected to a different cross-drive CD. As an example, if there are four slats in each group of a floor, one slat of each group will be attached to each cross-drive CD which will be, in turn, connected to its respective hydraulic cylinder HC. Slats attached to the same cross-drive are considered a "set."

In addition to floor slats, at least one power source, and cross-drives, a reciprocating slat-type conveyor 10 may include substructures such as subdecks, cross-members, and cross-drive shoes. Alternative adaptable reciprocating slat conveyors may use alternative substructure and drive mechanisms such as that shown and described in any of the references that are incorporated-by-reference herein. It should be noted that the present invention is not to be limited to these embodiments of the substructure and drive mechanisms.

Figure 3:
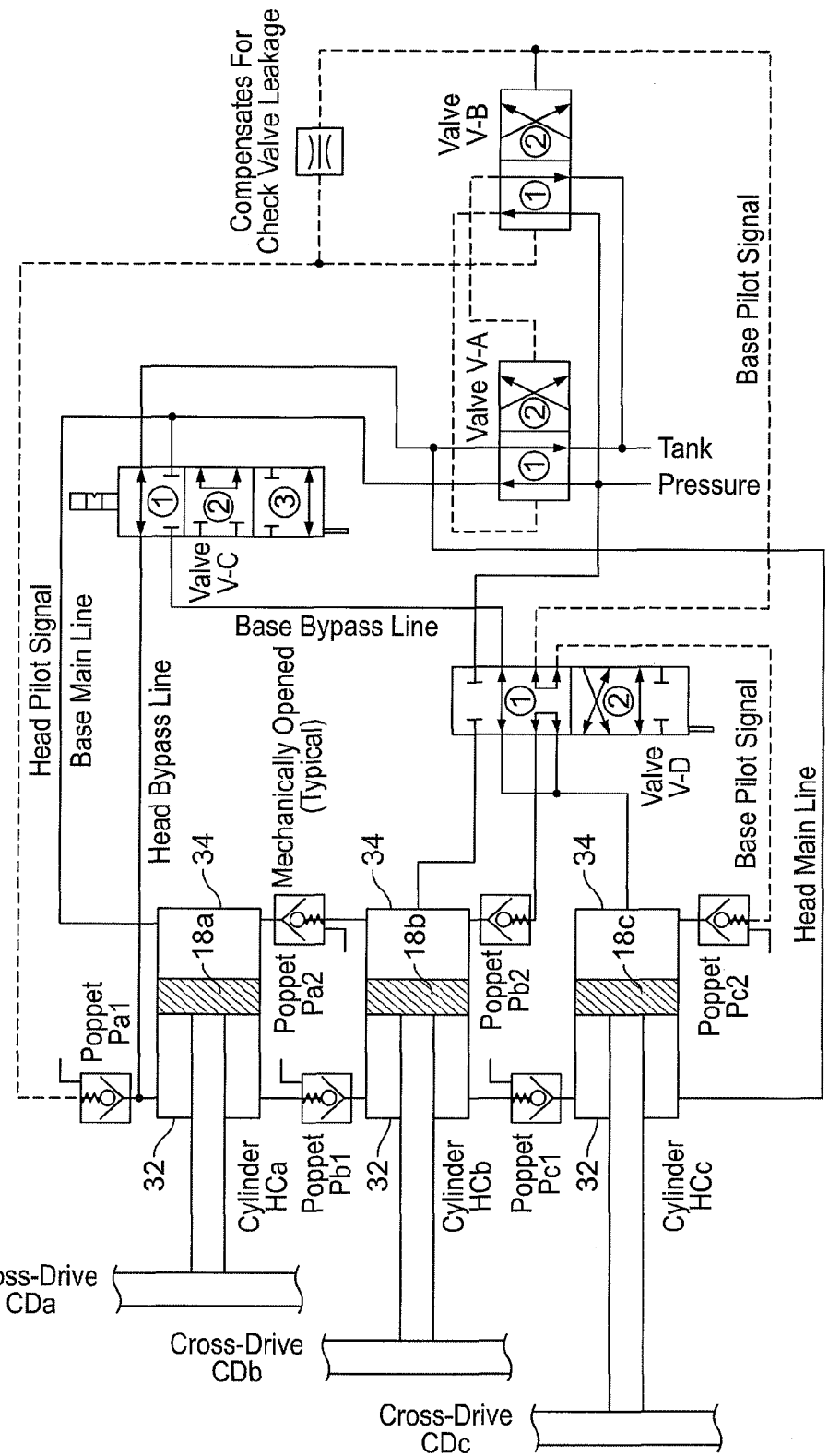
FIG. 3 is a hydraulic schematic of a preferred exemplary adaptable or multi-mode reciprocating slat conveyor that can operate in both a two-step non-continuous operating mode and a three-step continuous operating mode.

FIG. 3 is a hydraulic schematic of a preferred exemplary adaptable reciprocating slat conveyor that can operate in both a two-step non-continuous operating mode and a three-step non-continuous operating mode. This figure shows how the three hydraulic cylinders HCa, HCb, HCc are connected to respective cross-drives CDa, CDb, CDc (which, in turn, are connected to respective floor slats FSa, FSb, FSc as shown in other figures). The hydraulic cylinders HCa, HCb, HCc in this figure are shown as being controlled by a series of valves and poppets.

In FIG. 3, there are six hydraulic or mechanical check valves or poppets Pa1, Pa2, Pb1, Pb2, Pb3, Pc1, and Pc2 (referred to generally as poppets P). The poppets P monitor when the hydraulic cylinders HC reach their respective heads 32 and bases 34. In turn, the poppets P provide signals to and/or control the various valves and other hydraulic cylinders HC. For example, the ends of the strokes of the front and rear moving cross-drives CD which are connected (directly or indirectly) to the pistons 18a, 18b, 18c trigger poppets P which, in turn, trigger valves V (shown as four valves V-A, V-B, V-C, and V-D). The function of poppets is described in detail in U.S. Pat. No. 4,143,760 to Hallstrom, for example in FIGS. 3, 4, and 5 and the text describing these figures. In the adaptable reciprocating slat conveyor, the switching valve pilot is no longer controlled by direct mechanical linkage to the cross-drives, but by hydraulic linkage. Alternative adaptable reciprocating slat conveyors could incorporate the structure disclosed in U.S. Pat. No. 5,193,661 to Foster, the disclosure of which is herein incorporated by reference.

Valve V-A, which primarily controls the flow of fluid, is shown as a main, 4-way valve. Valve V-A has two positions, shown as valve position (1) and valve position (2). In position (1), the fluid flows so that the floor slats FS move rearward. In position (2), the fluid flows so that the floor slats FS move forward.

Valve V-B is shown as a pilot, 4-way valve. The primary purpose of valve V-B is to control the position of valve V-A. Valve V-B has two positions, shown as valve position (1) and valve position (2). The positions are controlled by the poppets P. For example, in the three-step mode, poppet Pa1 and poppet Pc2 are opened when a component of the respective piston 18a, 18c comes in contact with the poppet and the poppet, in turn, sends a signal to valve V-B which sends a signal to Valve V-A. Similarly, in the two-step mode, poppet Pa1 and poppet Pb2 are opened when a component of the respective piston 18a, 18c comes in contact with the poppet and the poppet, in turn, sends a signal to valve V-B which sends a signal to Valve V-A. As shown, valve V-A generally has the same position as valve V-B.

Valve V-C is shown as a control valve such as an on/off/forward/reverse, 4-way valve. As shown, valve V-C is manually controlled (e.g. as a push-pull handle or solenoid actuated 4-way valve operated by a push button operated switch) by the operator of the conveyor. Valve V-C has three positions, shown as valve position (1), valve position (2), and valve position (3). In position (2), the system is in idle. As shown there can be a detent in the neutral position that provides a solid location for the center position (the neutral position). In position (1), the system is unloading. In position (3), the system is loading. It should be noted that valve V-C may be automatically controlled by one or more sensors 40 (shown in phantom) that senses, for example, the weight of the load 30, the height of the load 30, the position of the load 30, the motion of the load 30, the pressure of the system, or other factors which would warrant a change in the valve V-C position (e.g. turning the system on or off or changing directions). For example, the system may operate until the sensor 40 sensed that the load 30 is passed a predetermined position (e.g. at the rear 16), and then the sensor 40 would automatically turn the system off.

Valve V-D is shown as a control valve such as a ⅔ step selector, 8-way valve. The primary purpose of this valve is to control whether the system is in the three-step operating mode or the two-step operating mode. Valve V-D has two positions, shown as valve position (1) and valve position (2). In position (1), the system is in the three-step operating mode. In position (2), the system is in the two-step operating mode. As shown, valve V-D can be manually controlled (e.g. as a push-pull handle or solenoid actuated 8-way valve operated by a push button operated switch) by the operator of the conveyor. It should be noted that valve V-D may be automatically controlled by one or more sensors 40 (shown in phantom) that senses, for example, the weight of the load 30, the height of the load 30, the position of the load 30, the motion of the load 30, the pressure of the system, or other factors which would warrant switching between operating modes. For example, the system may operate in a three-step mode until the sensor 40 sensed that the weight of the load had been reduced sufficiently so that it could be unloaded in the more power efficient two-step mode, and then the sensor 40 would automatically trigger the change.

Table 1 shows a chart of the valves V and the description of the hydraulic cylinder HC motion associated with the various valve positions of the adaptable reciprocating slat conveyor of FIG. 3.

TABLE 1

| Description of Hydraulic Cylinder HC Motion | Valve V-A | Valve V-B | Valve V-C | Valve V-D |
|---|---|---|---|---|
| S0—Idle—Pressure line bridged to tank | Any | Any | 2 | Any |
| S1—Three-step operating mode—Unloading—All cylinders move rearward | 1 | 1 | 1 | 1 |
| S2—Three-step operating mode—Unloading—Cylinders move forward (retract) one at a time; HCa, HCb, HCc | 2 | 2 | 1 | 1 |
| S3—Three-step operating mode—Loading—Cylinders move rearward (retract) one at a time; HCc, HCb, HCa | 1 | 1 | 3 | 1 |
| S4—Three-step operating mode—Loading—All cylinders move forward | 2 | 2 | 3 | 1 |
| S5—Two-step operating mode—Unloading—All cylinders move rearward (although one cylinder (HCc) may be held in this position) | 1 | 1 | 1 | 2 |
| S6—Two-step operating mode—Unloading—One cylinder (HCc) moves to (or is held in) rear position while cylinder HCa moves forward (retracts), and then HCb cylinder moves forward (retracts) | 2 | 2 | 1 | 2 |
| S7—Two-step operating mode—Loading—One cylinder (HCc) moves rearward (or is held in the rearmost position), then cylinder HCb moves rearward (retracts), and then HCa cylinder moves rearward (retracts) | 1 | 1 | 3 | 2 |
| S8—Two-step operating mode—Loading—One cylinder (HCc) moves rearward (or is held in the rearmost position), while cylinders HCa and HCb move forward together | 2 | 2 | 3 | 2 |

FIGS. 4-21 show an exemplary preferred adaptable reciprocating slat conveyor. This single adaptable reciprocating slat conveyor is capable of operating in an exemplary three-step non-continuous operating mode (shown unloading in FIGS. 4-8 and loading in FIGS. 9-13) and in an exemplary two-step non-continuous operating mode (shown unloading in FIGS. 14-17 and loading in FIGS. 18-21). The following paragraphs detail the steps shown in the figures. Unless it is described as "pre-motion", each figure depicts a motion of the preferred adaptable reciprocating slat conveyor after the movement has taken place, with the arrows indicating the direction in which the floor slats and cross-drives have moved.

Figure 4:
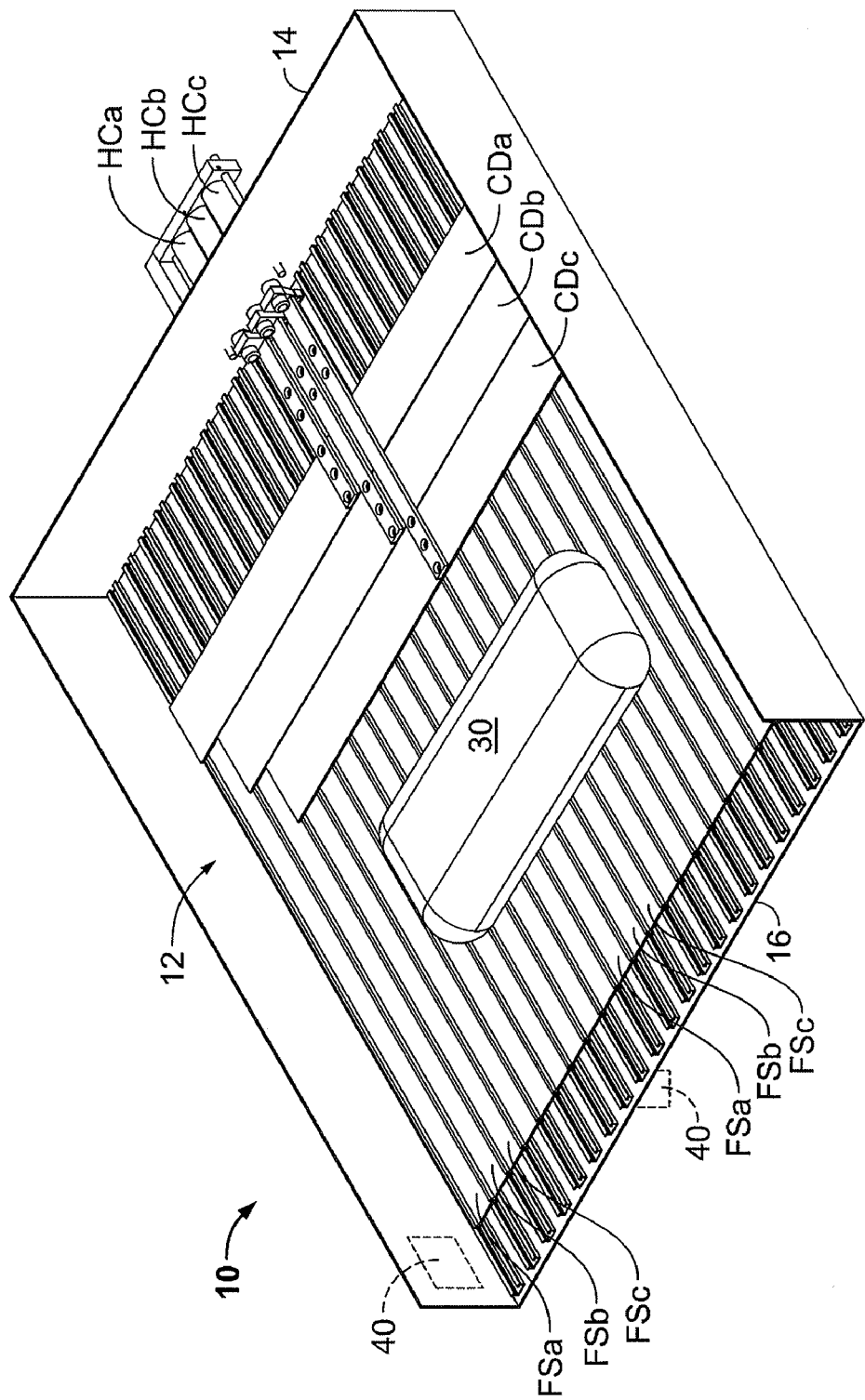
FIGS. 4-8 are perspective top views from an angle, of an adaptable or multi-mode reciprocating slat conveyor operating in a three-step non-continuous operating mode, that together show an exemplary unloading process.
Figure 5:
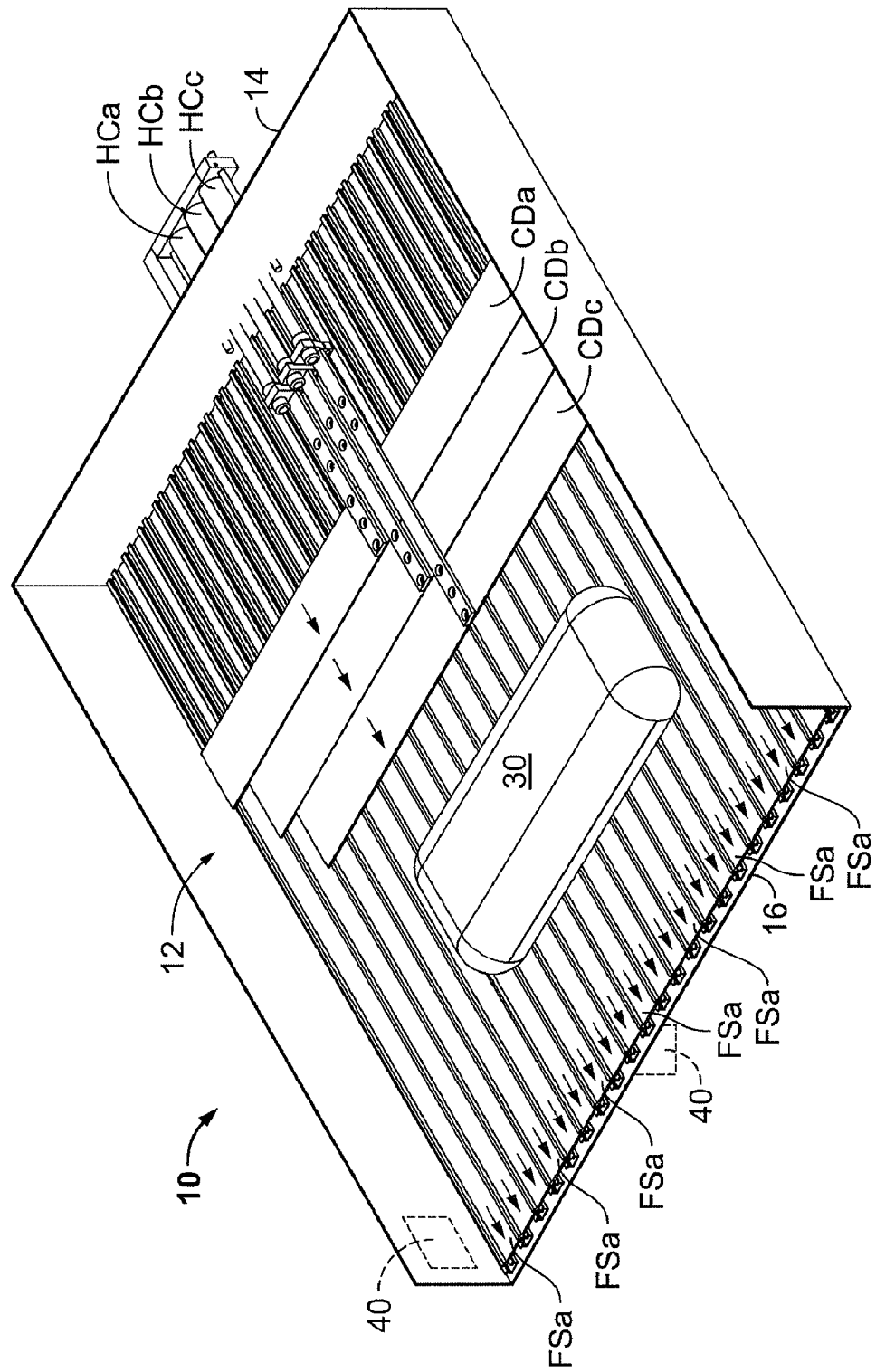
Figure 6:
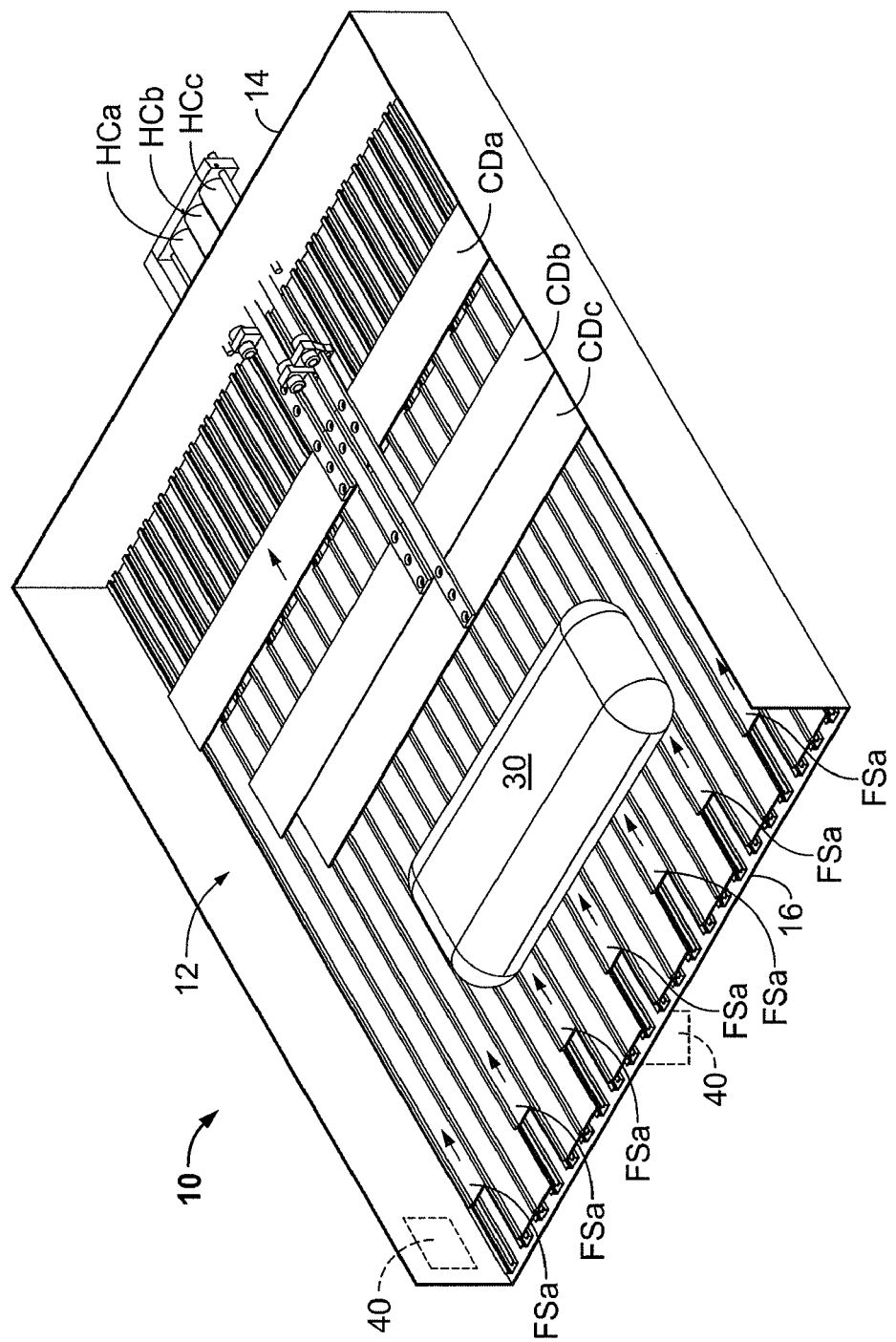
Figure 7:
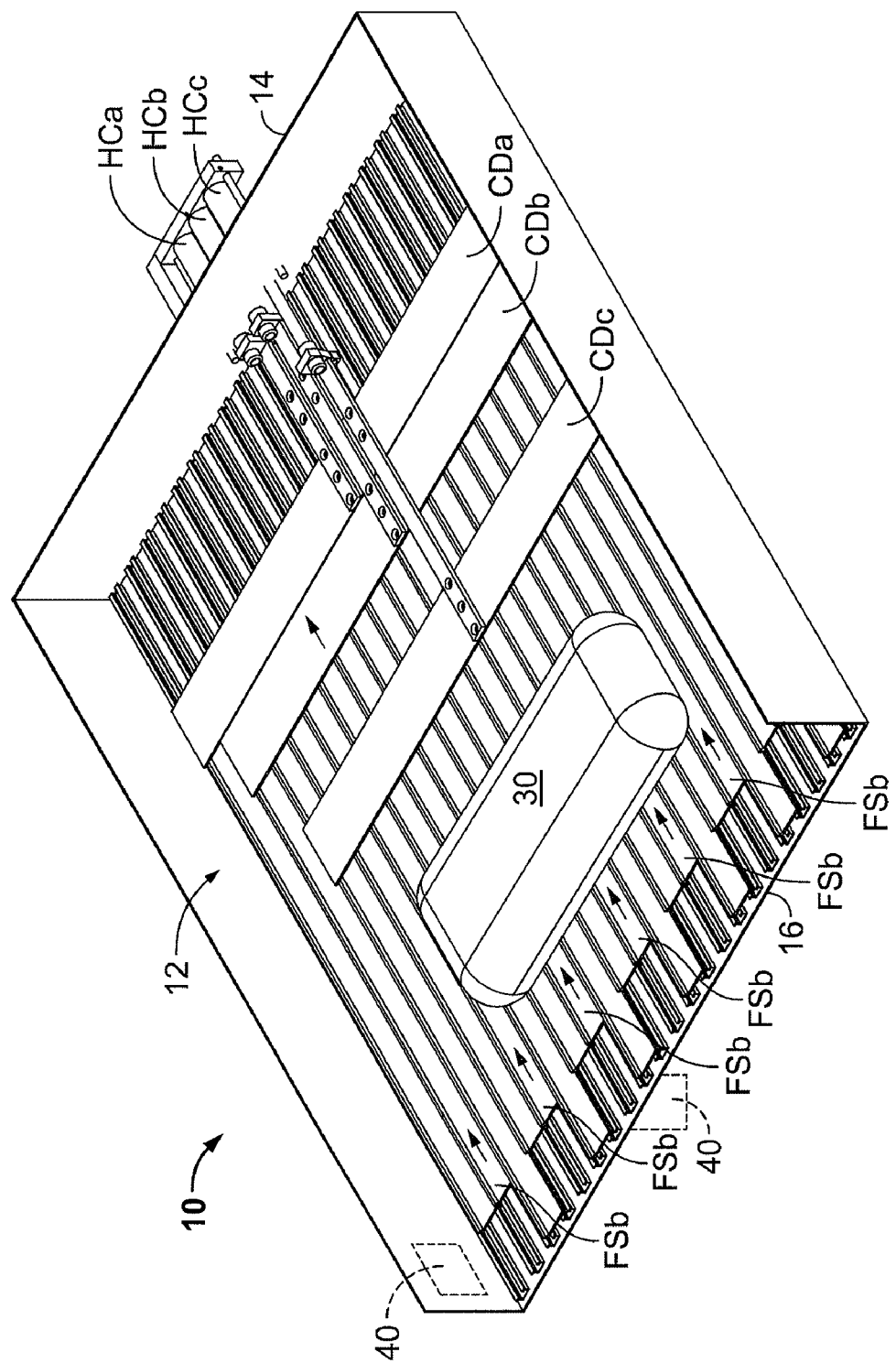
Figure 8:
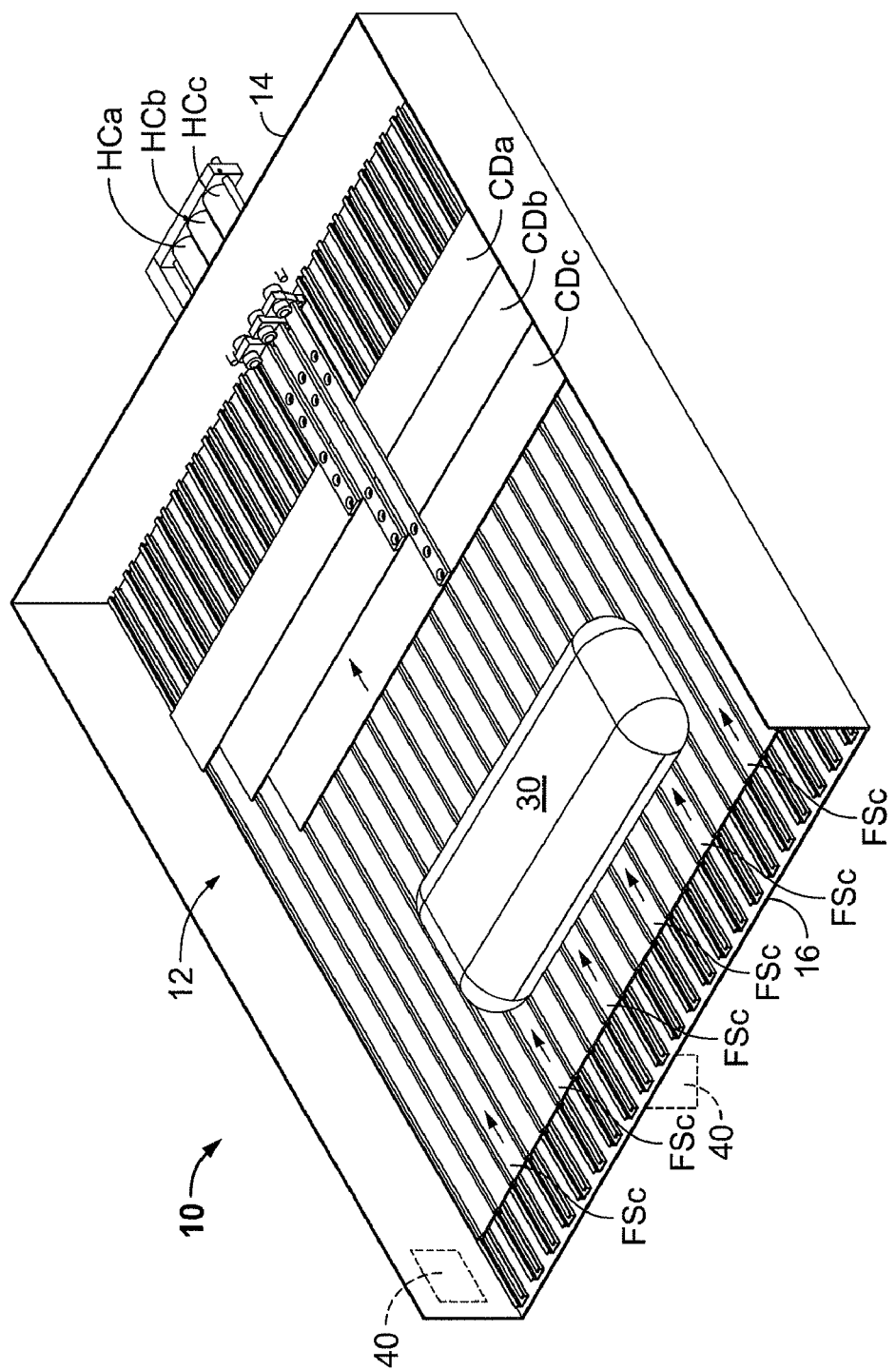

FIGS. 4-8 show the process of unloading in a three-step non-continuous operating mode. As this is an unloading process, the load-conveying direction (motion) is from the front 14 to the back 16 of the load-holding compartment 12. In other words, the load (shown as large package 30 for simplicity, but more likely to be some sort of particulate matter) in the unloading process is moving out of the load-holding compartment 12. In this adaptable reciprocating slat conveyor, each grouping has three floor slats FSa, FSb, FSc. For purposes of explanation, FIG. 4 depicts a pre-motion step in which all of the floor slats FS start towards the front 14 of the load-holding compartment 12. FIG. 5 depicts the load conveying motion in which all the floor slats FS have moved rearward together (toward the rear 16 in the load-conveying direction). As this is a three-step continuous operating mode, each of the three floor slats FSa, FSb, FSc in a group will be retracted individually with its respective set (toward the front 14, in the load-retracting direction). FIG. 6 depicts a motion in which floor slats FSa (those attached to the cross-drive CDa) have been retracted. Floor slats FSa have moved toward the front 14 of the load-holding compartment 12 in the load-retracting direction. The other floor slats FSb and FSc at least partially hold the load 30 substantially in place during the retraction of the floor slats FSa. FIG. 7 depicts a motion in which floor slats FSb (those attached to the cross-drive CDb) have been retracted. Floor slats FSb have moved toward the front 14 of the load-holding compartment 12 in the load-retracting direction. The other floor slats FSa and FSc at least partially hold the load 30 substantially in place during the retraction of the floor slats FSb. Finally, FIG. 8 depicts how floor slats FSc (those attached to the third cross-drive CDc) have been retracted. Floor slats FSc have moved toward the front 14 of the load-holding compartment 12 in the load-retracting direction. The other floor slats FSa and FSb at least partially hold the load 30 substantially in place during the retraction of the floor slats FSc. Comparing FIG. 8 with FIG. 4, it is apparent that the load 30 has moved toward the rear 16 of the load-holding compartment 12. The process would be repeated until the load 30 was removed from the load-holding compartment 12.

Using Table 1 and FIG. 3, the load-conveying motion occurs when the system is in state S1 in which all the floor slats FS move to the rear 16 in unison. In state S1, all the valves will be in valve position (1). Similarly, using Table 1 and FIG. 3, the load-retracting motion occurs when the system is in state S2 in which each floor slat FS group will retract separately with their respective set. In state S2, valves V-A and V-B will be in valve position (2) and valves V-C and V-D will be in valve position (1).

Figure 9:
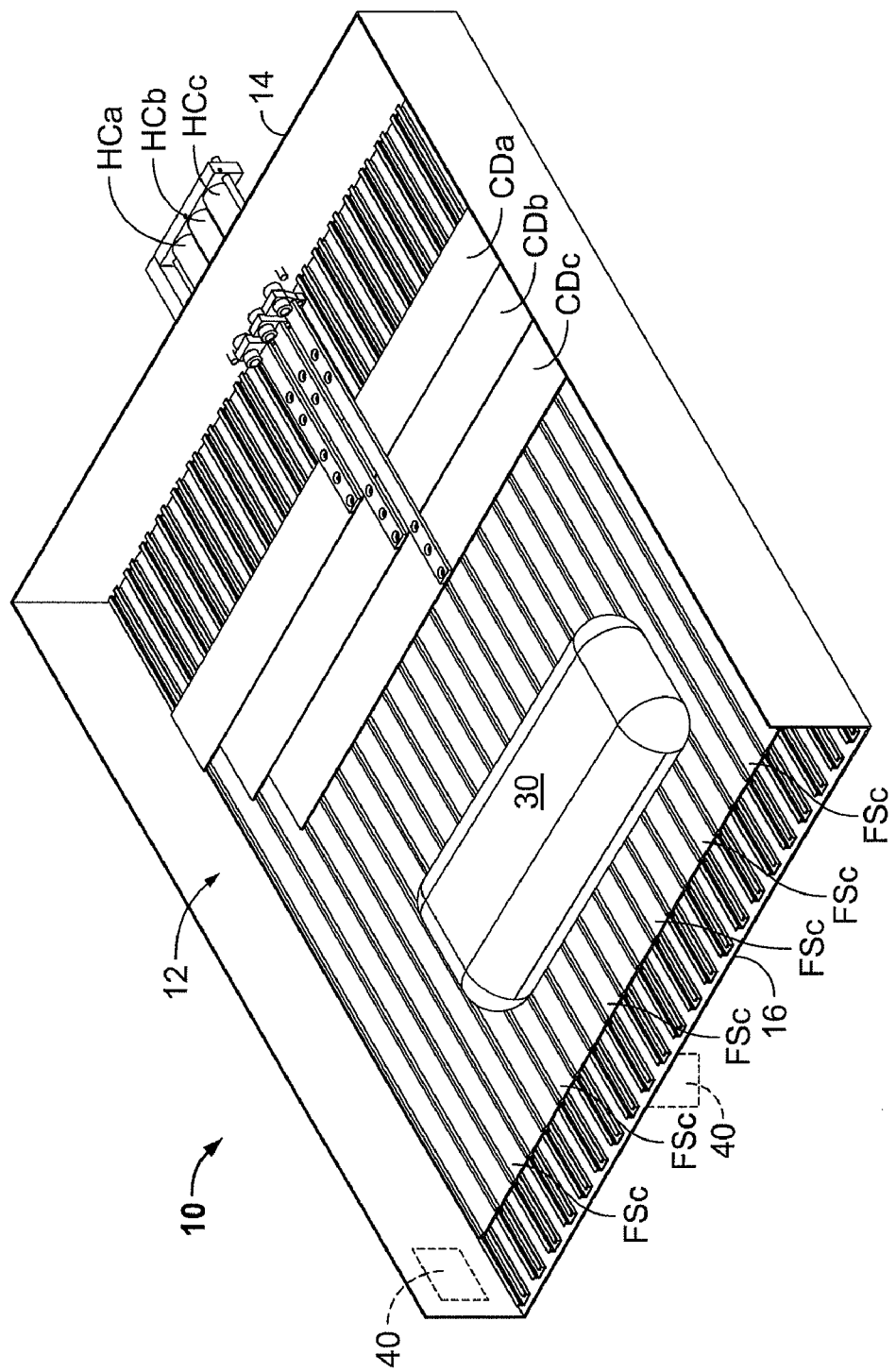
FIGS. 9-13 are perspective top views from an angle, of an adaptable or multi-mode reciprocating slat conveyor operating in a three-step non-continuous operating mode, that together show an exemplary loading process.
Figure 10:
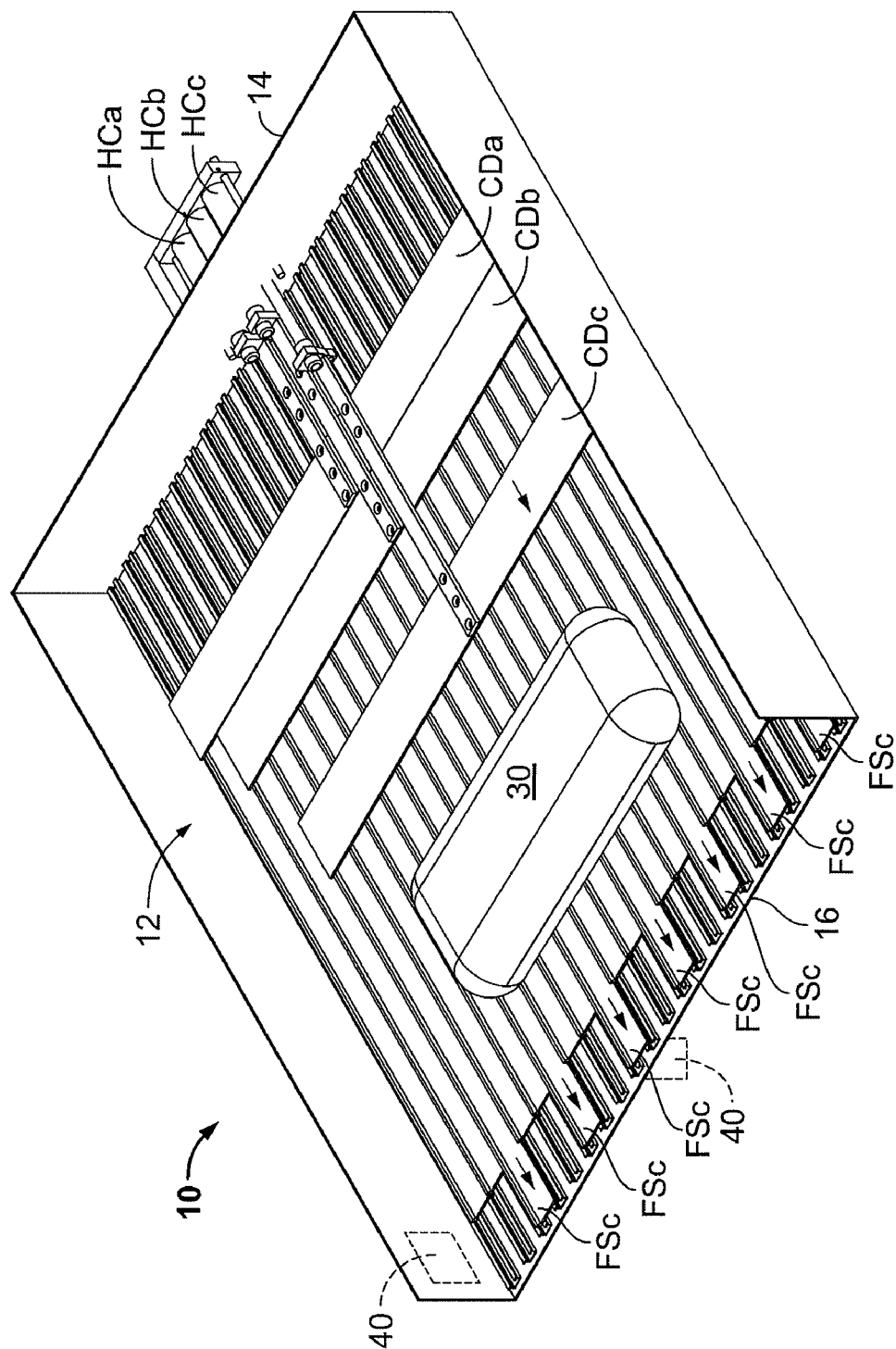
Figure 11:
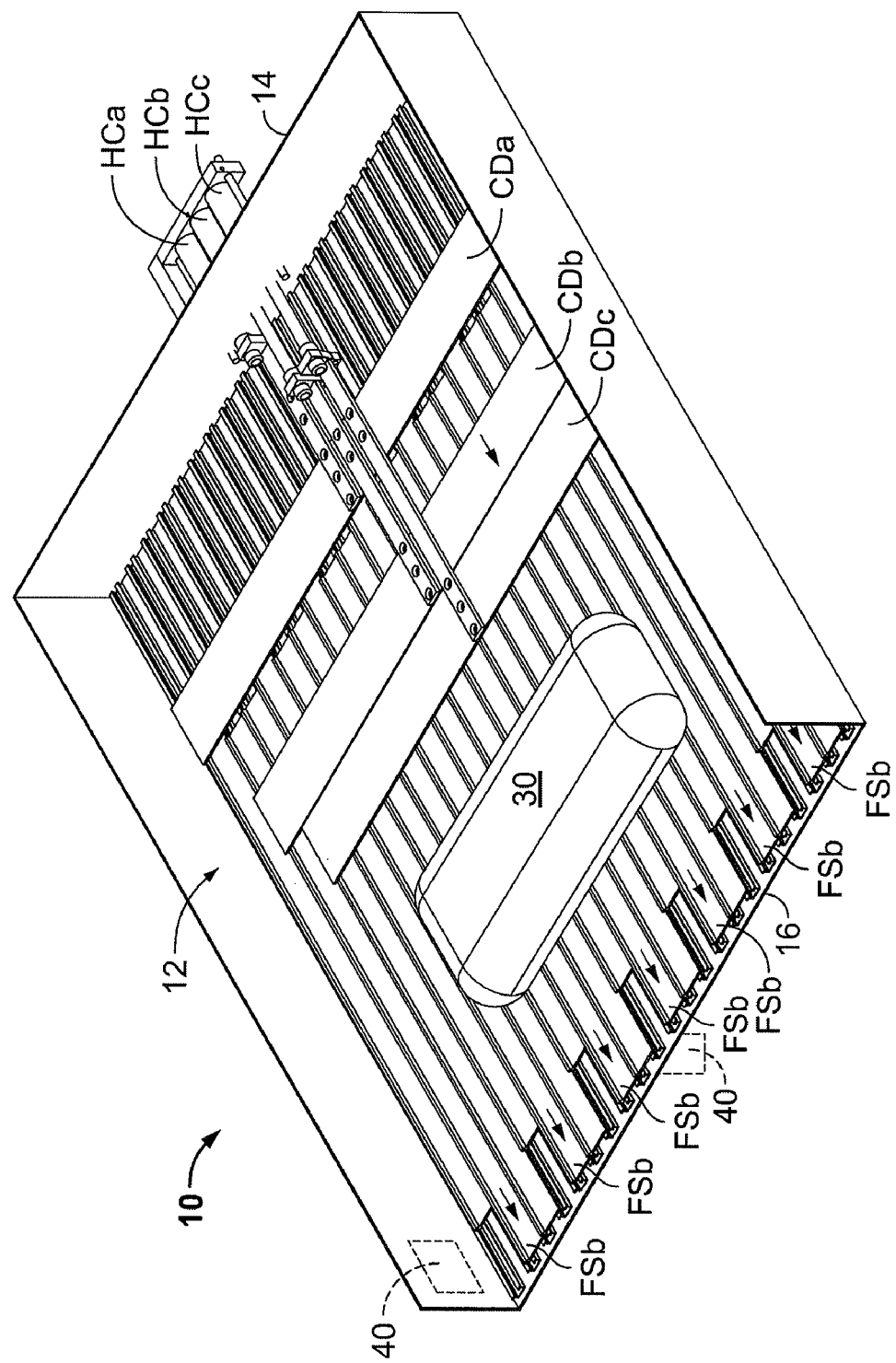
Figure 12:
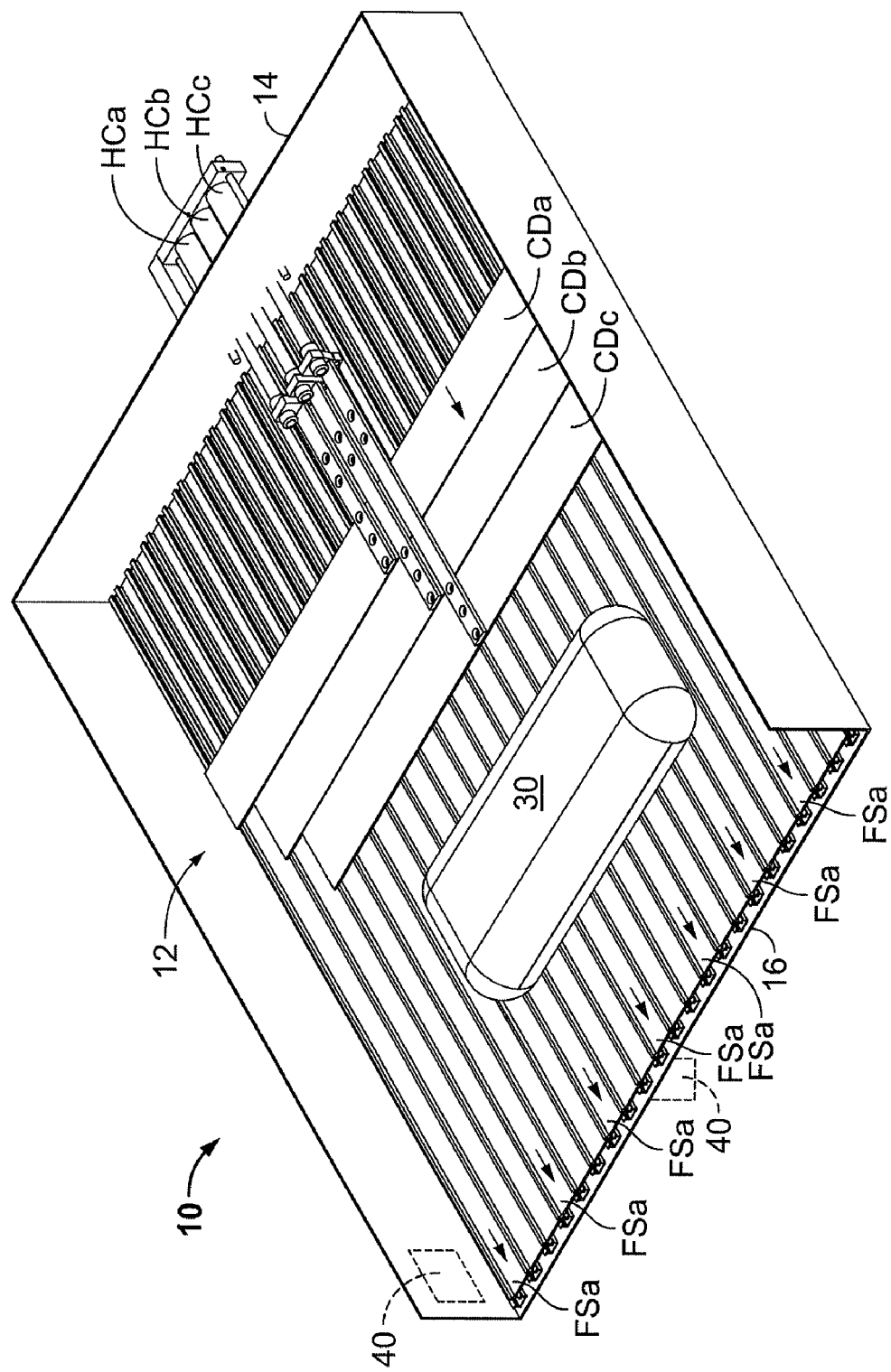
Figure 13:
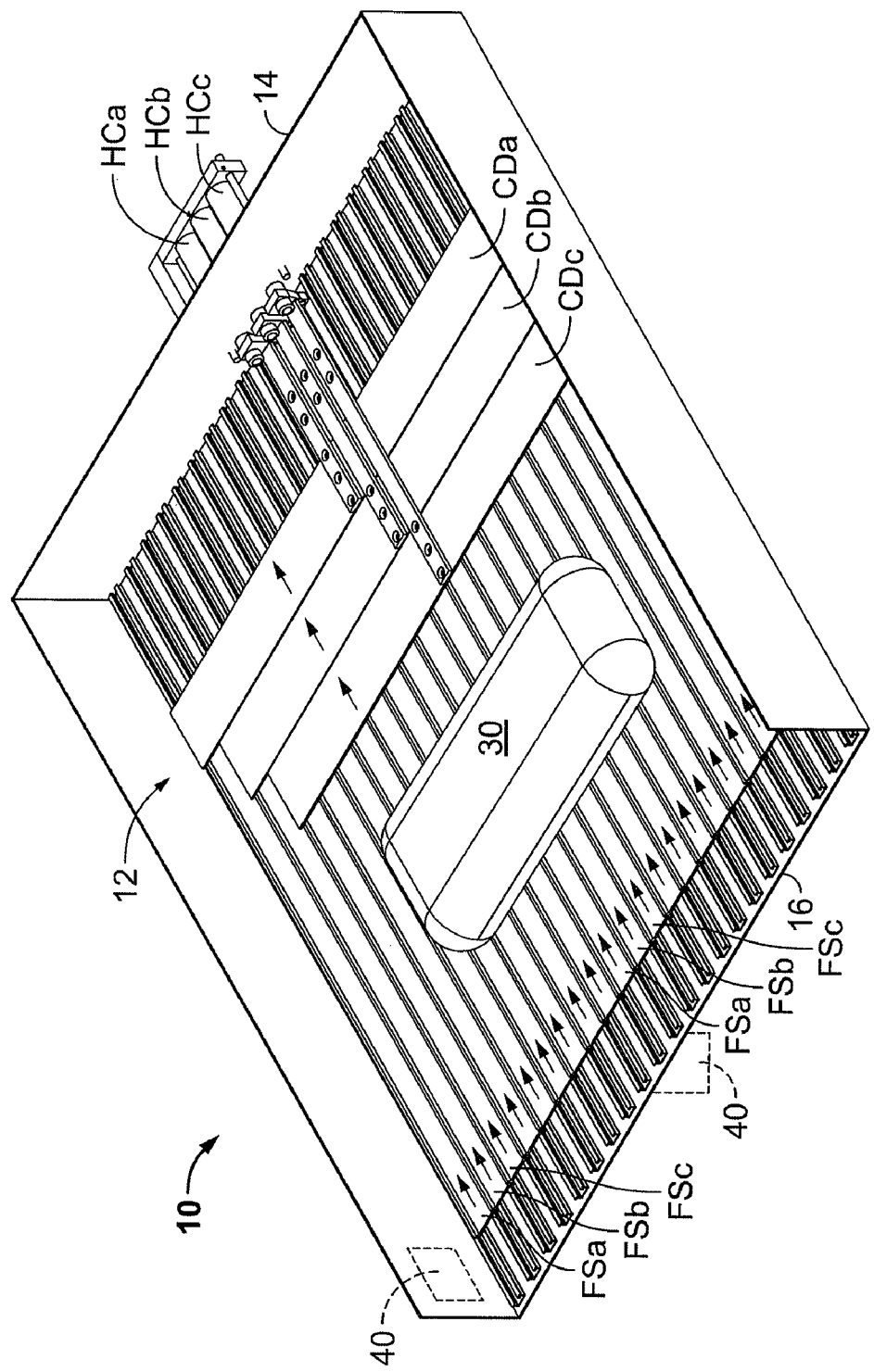

FIGS. 9-13 show the process of loading in a three-step non-continuous operating mode. As this is a loading process, the load-conveying direction (motion) is from the back 16 to the front 14 of the load-holding compartment 12. In other words, the load (shown as large package 30 for simplicity, but more likely to be some sort of particulate matter) in the loading process is moving into the load-holding compartment 12. In this adaptable reciprocating slat conveyor, each grouping has three floor slats FSa, FSb, FSc. For purposes of explanation, FIG. 9 shows a pre-motion step in which all of the floor slats FS start towards the front 14 of the load-holding compartment 12. As this is a three-step continuous operating mode, each of the three floor slats FSa, FSb, FSc in a group will be retracted individually with its respective set (toward the rear 16, in the load-retracting direction). FIG. 10 depicts a motion in which floor slats FSc (those attached to the cross-drive CDc) have been retracted. Floor slats FSc have moved toward the rear 16 of the load-holding compartment 12 in the load-retracting direction. The other floor slats FSa and FSb at least partially hold the load 30 substantially in place during the retraction of the floor slats FSc. FIG. 11 depicts a motion in which floor slats FSb (those attached to the cross-drive CDb) have been retracted. Floor slats FSb have moved toward the rear 16 of the load-holding compartment 12 in the load-retracting direction. The other floor slats FSa and FSc at least partially hold the load 30 substantially in place during the retraction of the floor slats FSb. FIG. 12 depicts a motion in which floor slats FSa (those attached to the cross-drive CDa) have been retracted. Floor slats FSa have moved toward the rear 16 of the load-holding compartment 12 in the load-retracting direction. The other floor slats FSb and FSc at least partially hold the load 30 substantially in place during the retraction of the floor slats FSa. FIG. 13 depicts the load conveying motion in which all the floor slats FS have moved forward together (toward the front 14 of the load-holding compartment 12 in the load-conveying direction). Comparing FIG. 13 with FIG. 9, it is apparent that the load 30 has moved toward the front 14 of the load-holding compartment 12. The process would be repeated until the load 30 was fully loaded into the load-holding compartment 12.

Using Table 1 and FIG. 3, the load-retracting motion occurs when the system is in state S3 in which each floor slat FS set will retract separately. In state S3, valves V-A and V-B will be in valve position (1), valve V-C will be in valve position (3), and valve V-D will be in valve position (1). Similarly, using Table 1 and FIG. 3, the load-conveying motion occurs when the system is in state S4 in which all the floor slats FS move to the front 14 in unison. In state S4, valves V-A and V-B will be in valve position (2) and valves V-C and V-D will be in valve position (1).

Figure 14:
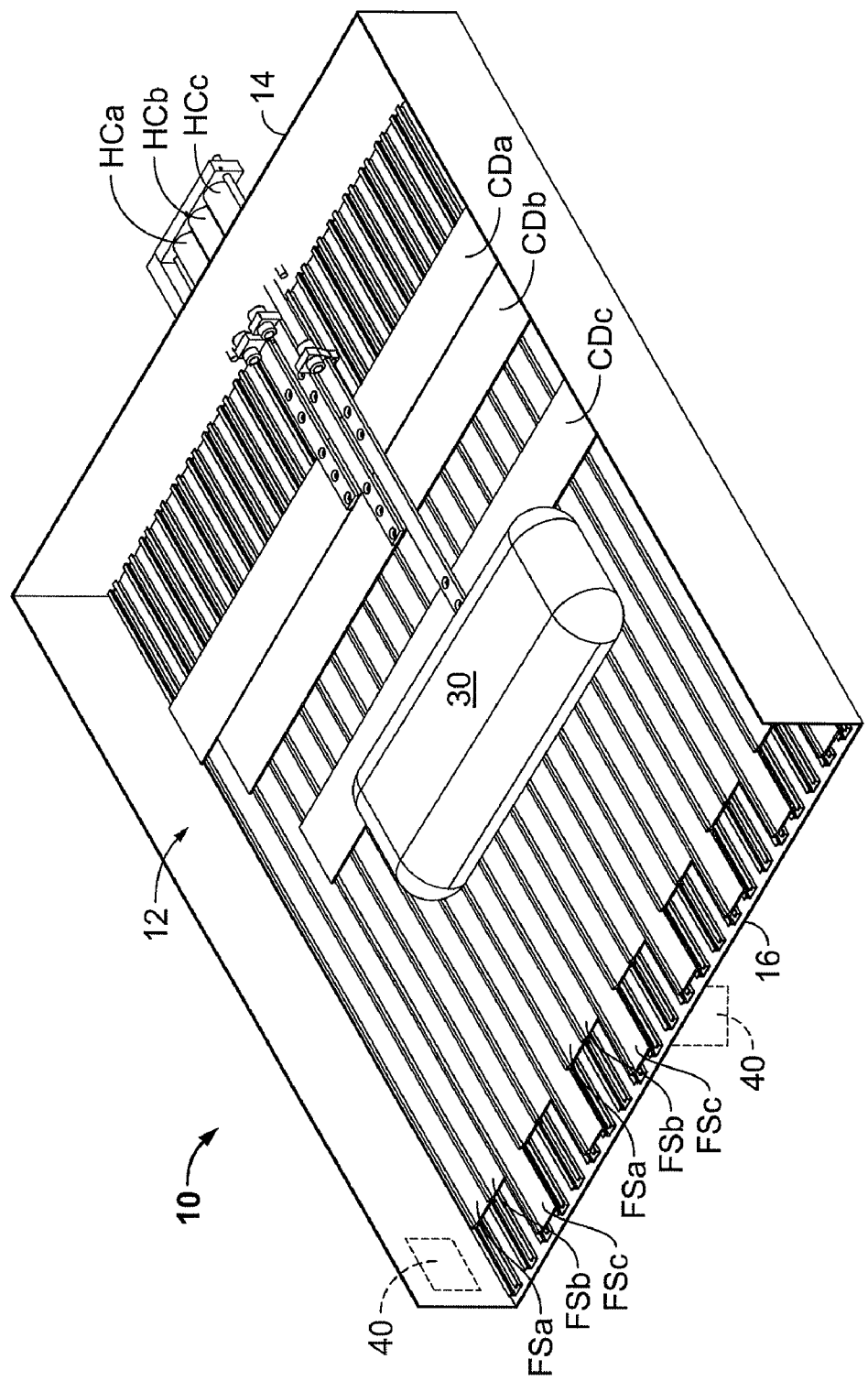
FIGS. 14-17 are perspective top views from an angle, of an adaptable or multi-mode reciprocating slat conveyor operating in a two-step non-continuous operating mode, that together show an exemplary unloading process.
Figure 15:
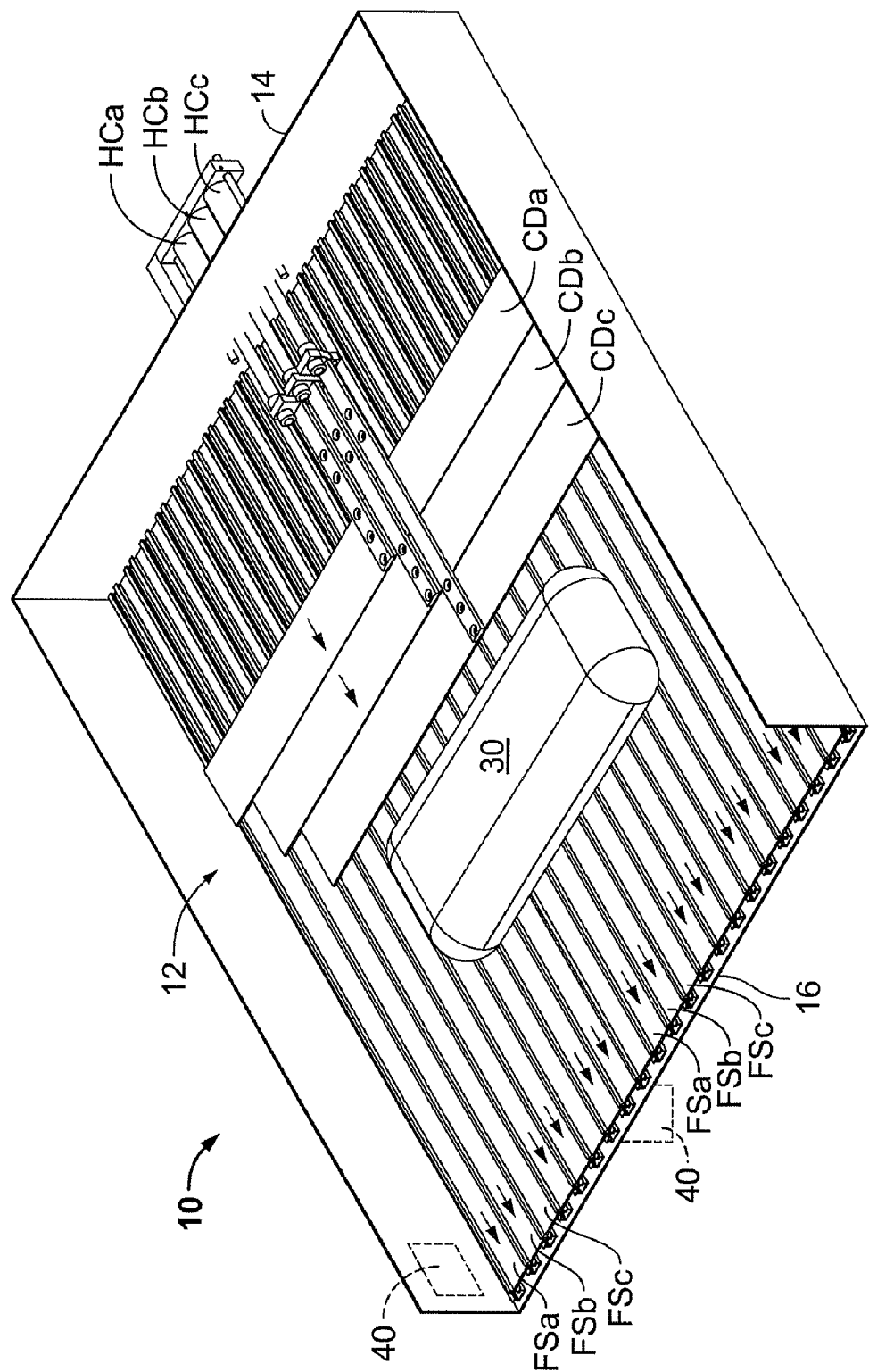
Figure 16:
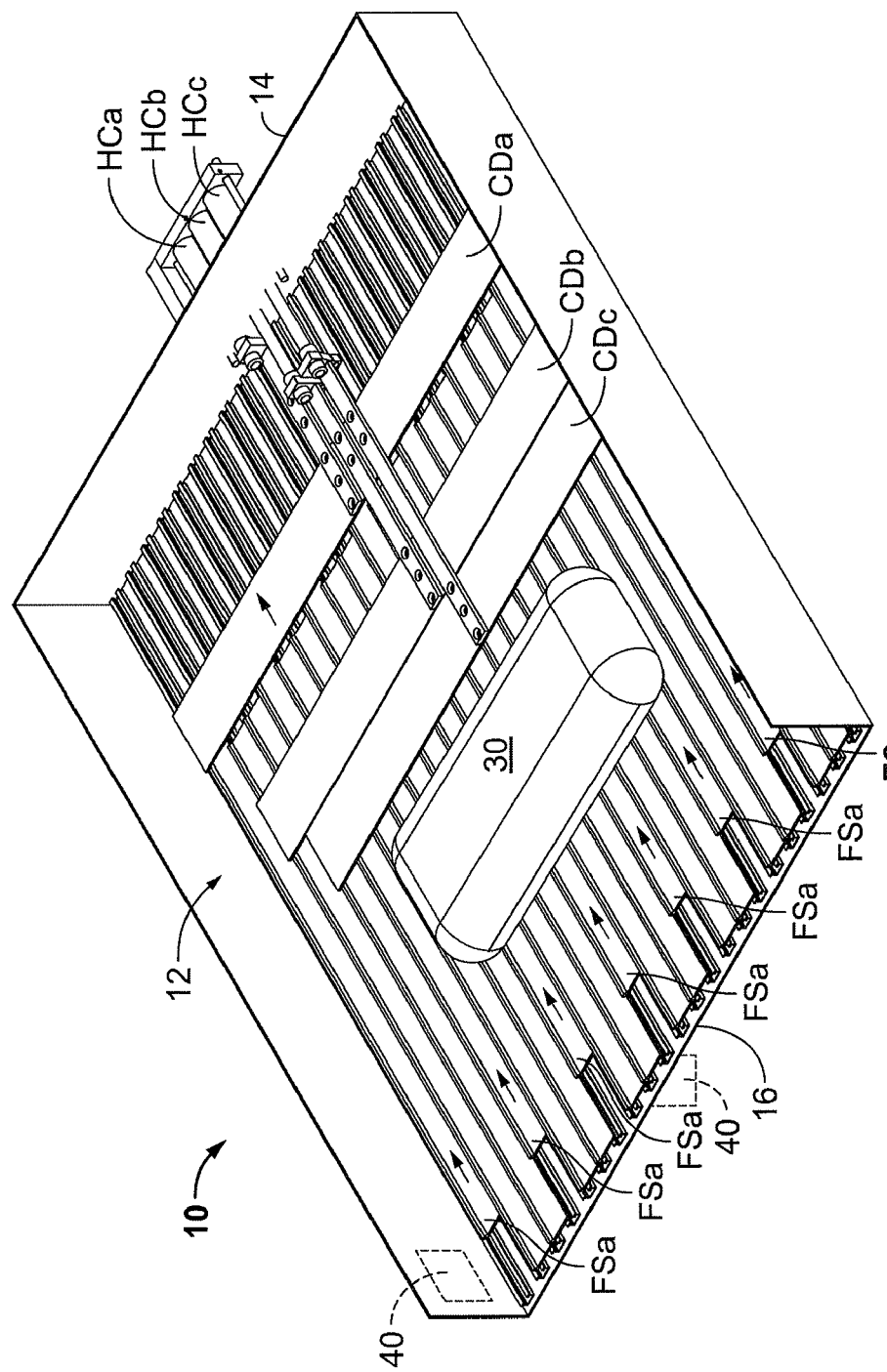
Figure 17:
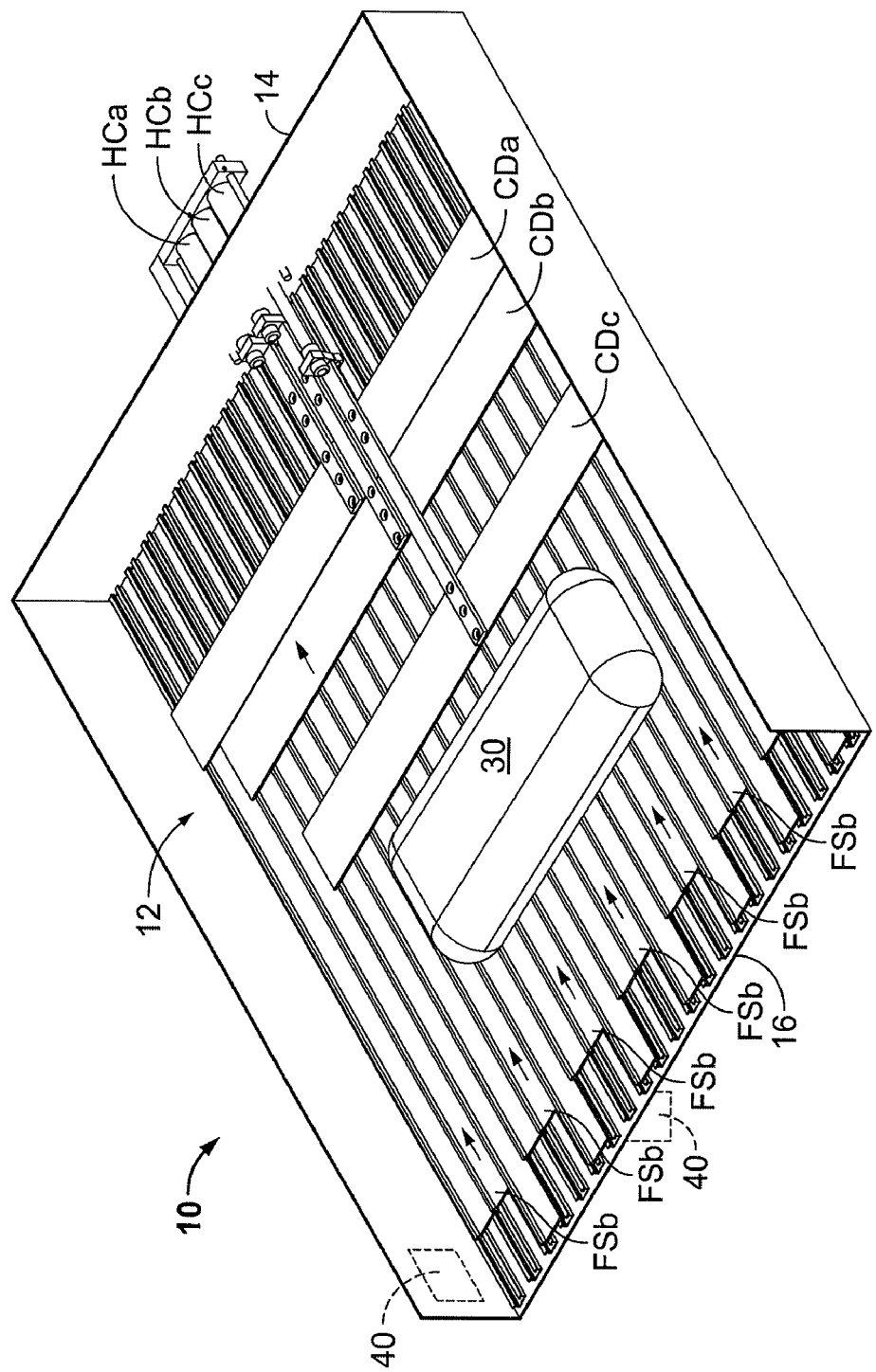

FIGS. 14-17 show the process of unloading in a two-step non-continuous operating mode. As this is an unloading process, the load-conveying direction (motion) is from the front 14 to the back 16 of the load-holding compartment 12. In other words, the load (shown as large package 30 for simplicity, but more likely to be some sort of particulate matter) in the unloading process is moving out of the load-holding compartment 12. In this adaptable reciprocating slat conveyor, each grouping has three floor slats FSa, FSb, FSc, but one floor slat FSc in each grouping does not move. For purposes of explanation, FIG. 14 shows a pre-motion step in which floor slat FSc has remained stationary. FIG. 15 depicts the load conveying motion in which floor slats FSa and FSb have moved rearward together (toward the rear 16 in the load-conveying direction) as cross-drives CDa and CDb have moved rearward. The load 30 has advanced rearward between FIG. 14 and FIG. 15. As this is a two-step non-continuous operating mode, each of the two moving floor slats FSa and FSb in a group will be retracted individually with its respective set (toward the front 14, in the load-retracting direction). FIG. 16 depicts a motion in which floor slats FSa (those attached to the cross-drive CDa) have been retracted. Floor slats FSa have moved toward the front 14 of the load-holding compartment 12 in the load-retracting direction. The other floor slats FSb and FSc at least partially hold the load 30 substantially in place during the retraction of the floor slats FSa. FIG. 17 depicts a motion in which floor slats FSb (those attached to the cross-drive CDb) have been retracted. Floor slats FSb have moved toward the front 14 of the load-holding compartment 12 in the load-retracting direction. The other floor slats FSa and FSc at least partially hold the load 30 substantially in place during the retraction of the floor slats FSb. It should be noted that FIG. 17 shows this adaptable reciprocating slat conveyor in substantially the same position as that shown in FIG. 14, except that the load 30 has moved toward the rear 16 of the load-holding compartment 12. The process would be repeated until the load 30 was removed from the load-holding compartment 12.

Using Table 1 and FIG. 3, the load-conveying motion occurs when the system is in state S5 in which two of the floor slats FSa and FSb move to the rear 16 in unison. In state S5, valves V-A and V-B will be in valve position (1), valve V-C will be in valve position (1), and valve V-D will be in valve position (2). Similarly, using Table 1 and FIG. 3, the load-retracting motion occurs when the system is in state S6 in which two floor slats FSa and FSb from each floor slat group move forward with their respective sets (retract) separately. In state S6, valves V-A and V-B will be in valve position (2), valve V-C will be in valve position (1), and valve V-D will be in valve position (2). In both state S5 and S6, valve V-D isolates hydraulic cylinder HCc from the other two cylinders HCa, HCb and, instead, the base of cylinder HCc is fed the system pressure to force it to extend completely (or substantially completely) and be held in the extended position while the other cylinders HCa, HCb move in the normal fashion.

In this preferred exemplary adaptable reciprocating slat conveyor, the switch between three-step mode and two-step mode is accomplished by rerouting the flow of hydraulic oil to the hydraulic cylinders HCb and HCc. Basically this causes pressure to hold the hydraulic cylinder HCc stationary at the rearward end of its motion (so that one floor slat FSc in each group is held toward the rear 16) and redirecting to hydraulic cylinder HCb the pattern of hydraulic oil flow that was controlling hydraulic cylinder HCc. It should be noted that the means for switching to a new operating mode may include mechanical means (e.g. mechanical switches, mechanical valves, mechanical or electromechanical mechanisms to block HCc from moving, and other mechanical devices that allow switching between a plurality of states), electrical means (e.g. electrical switches, electrical valves, and other electrical devices that allow switching between a plurality of states), processor controlled mechanisms (e.g. computer or processor logic units), disconnection means (e.g. mechanically, electrically, or using a signal processor to disconnect one or more slats per group from one or more power sources, such as disconnecting the hydraulic cylinder HCc from the cross-drive CDc), switching mechanisms known or yet to be discovered, or combinations of the aforementioned switching mechanisms.

Figure 18:
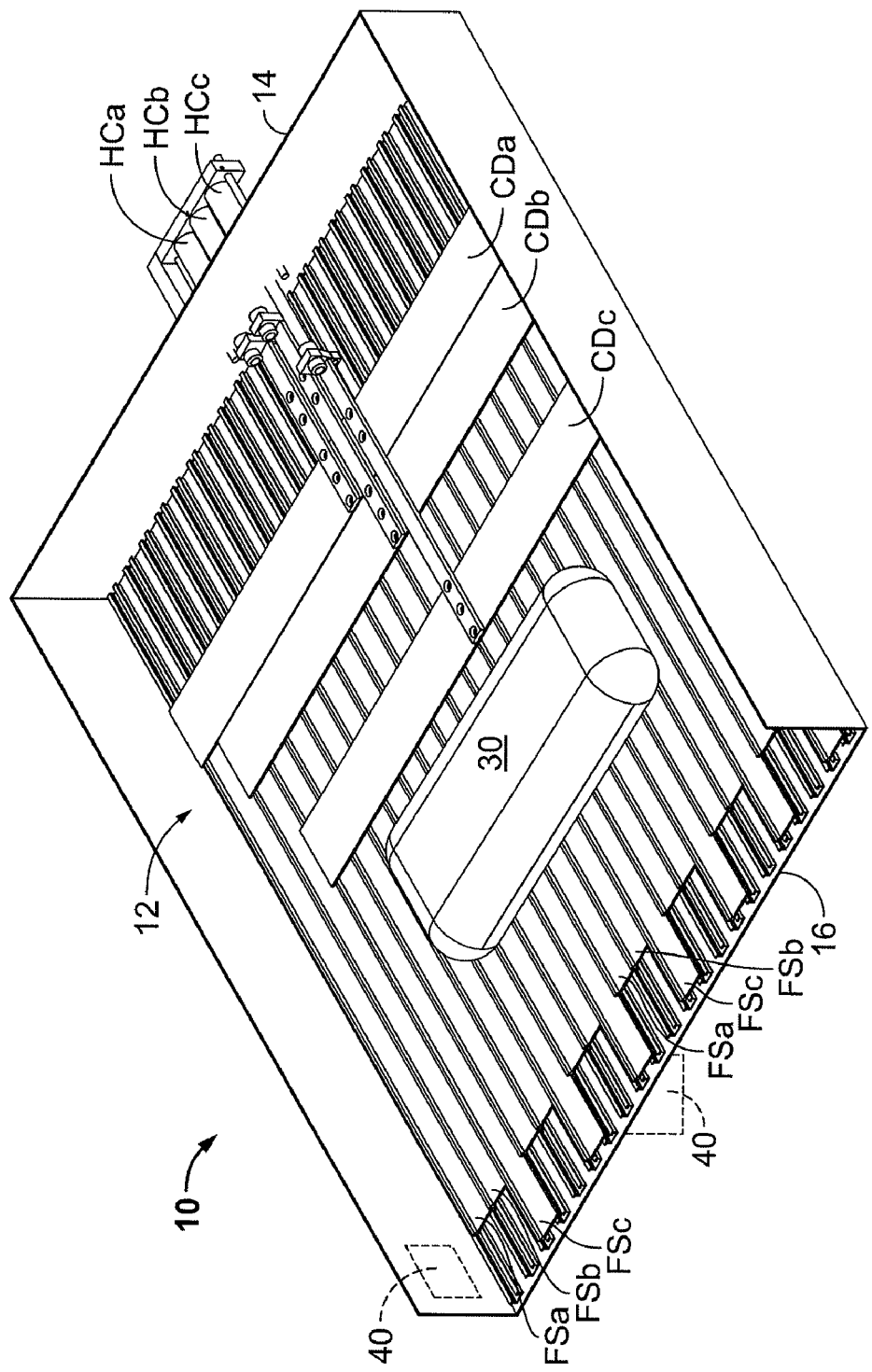
FIGS. 18-21 are perspective top views from an angle, of an adaptable or multi-mode reciprocating slat conveyor operating in a two-step non-continuous operating mode, that together show an exemplary loading process.
Figure 19:
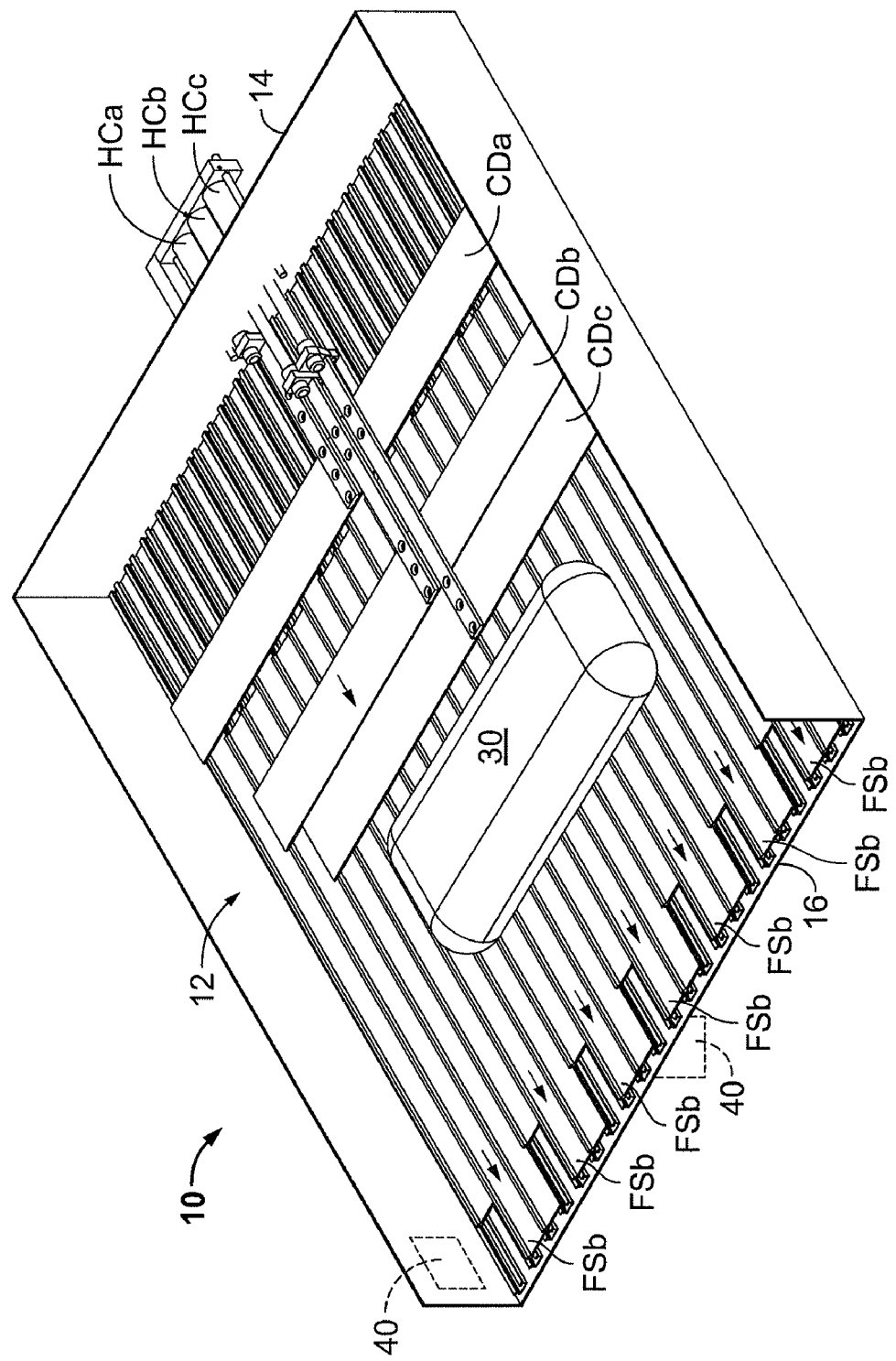
Figure 20:
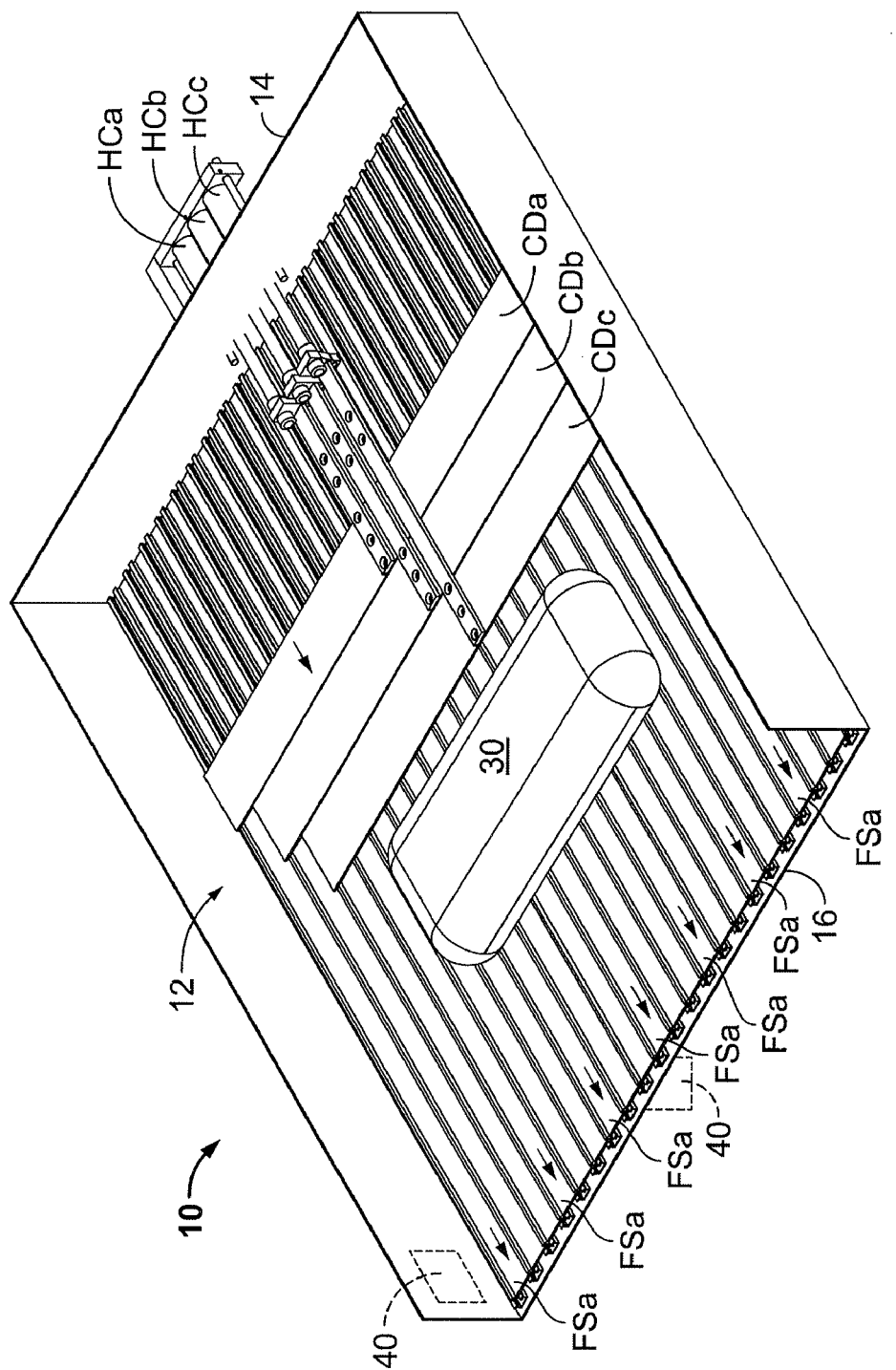
Figure 21:
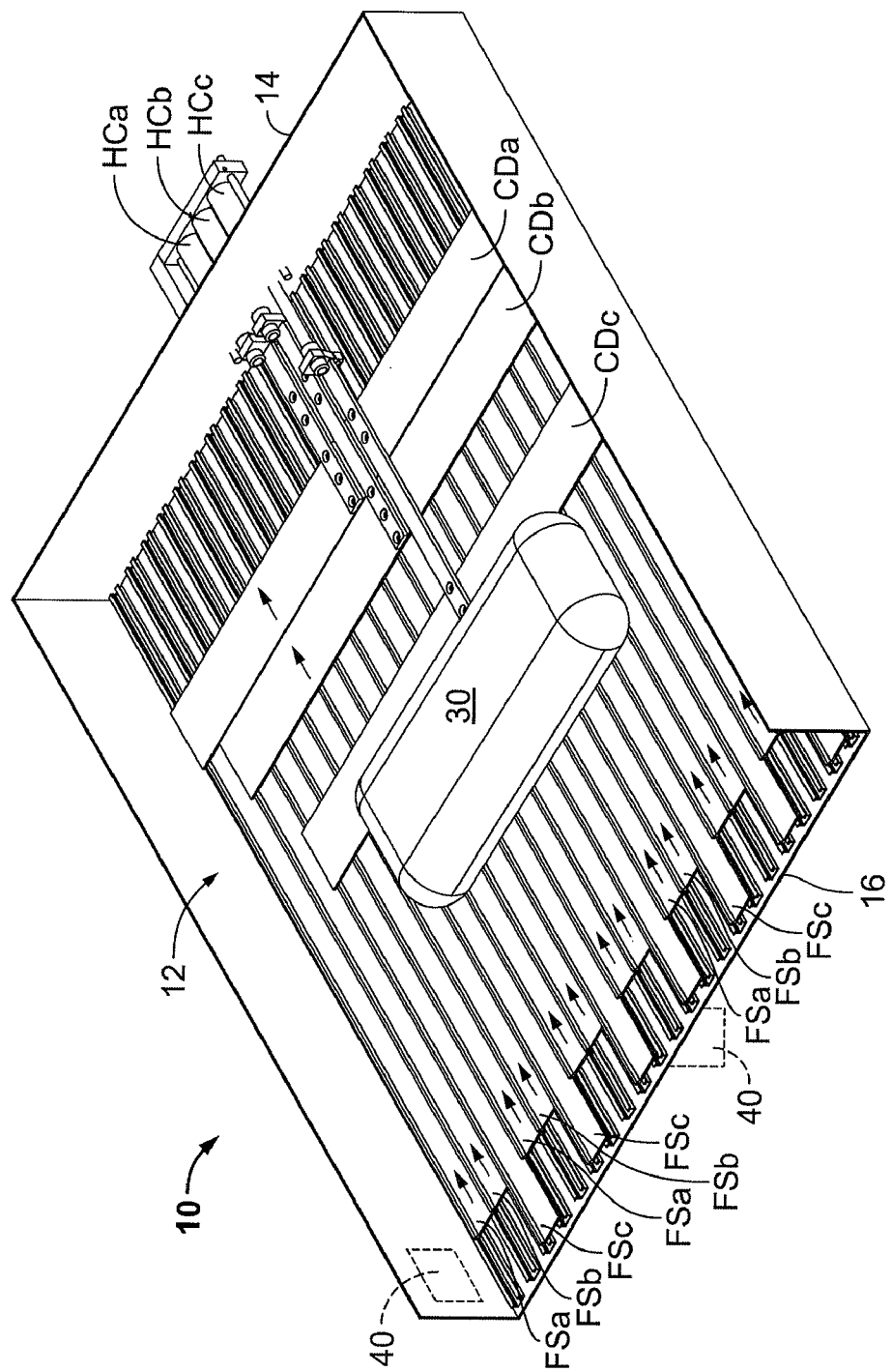

FIGS. 18-21 show the process of loading in a two-step non-continuous operating mode. As this is a loading process, the load-conveying direction (motion) is from the back 16 to the front 14 of the load-holding compartment 12. In other words, the load (shown as large package 30 for simplicity, but more likely to be some sort of particulate matter) in the loading process is moving into the load-holding compartment 12. In this adaptable reciprocating slat conveyor, each grouping has three floor slats FSa, FSb, FSc, but one floor slat FSc in each grouping does not move. For purposes of explanation, FIG. 18 shows a pre-motion step in which floor slat FSc has remained stationary. As this is a two-step non-continuous operating mode, each of the two moving floor slats FSa and FSb in a group will be retracted individually with its respective set (toward the rear 16, in the load-retracting direction). FIG. 19 depicts a motion in which floor slats FSb (those attached to the cross-drive CDb) have been retracted. The floor slats FSb have moved toward the rear 16 of the load-holding compartment 12 in the load-retracting direction. The other floor slats FSa and FSc at least partially hold the load 30 substantially in place during the retraction of the floor slats FSb. FIG. 20 depicts a motion in which floor slats FSa (those attached to the cross-drive CDa) have been retracted. The floor slats FSa have moved toward the rear 16 of the load-holding compartment 12 in the load-retracting direction. The other floor slats FSb and FSc at least partially hold the load 30 substantially in place during the retraction of the floor slats FSa. Finally, FIG. 21 depicts the load conveying motion in which floor slats FSa and FSb have moved forward together (toward the front 14 in the load-conveying direction) as cross-drives CDa and CDb move forward. The load 30 has advanced forward between FIG. 20 and FIG. 21. It should be noted that FIG. 21 shows this adaptable reciprocating slat conveyor in substantially the same position as that shown in FIG. 18, except that the load 30 has moved toward the front 14 of the load-holding compartment 12. The process would be repeated until the load 30 had been moved into the load-holding compartment 12.

Using Table 1 and FIG. 3, the load-retracting motion occurs when the system is in state S7 in which two floor slats FSa and FSb from each floor slat group move rearward (retract) separately with their respective sets. In state S7, valves V-A and V-B will be in valve position (1), valve V-C will be in valve position (3), and valve V-D will be in valve position (2). Similarly, using Table 1 and FIG. 3, the load-conveying motion occurs when the system is in state S8 in which two of the floor slats FSa and FSb move to the front 14 in unison. In state S8 Valve V-A and V-B are in position 2. In both state S7 and S8, valve V-C will be in valve position (3), and valve V-D will be in valve position (2). In this state, valve V-D isolates hydraulic cylinder HCc from the other two cylinders HCa, HCb and, instead, the base of cylinder HCc is fed the system pressure to force it to extend completely (or substantially completely) and be held in the extended position while the other cylinders HCa, HCb move in the normal fashion.

Figure 22:
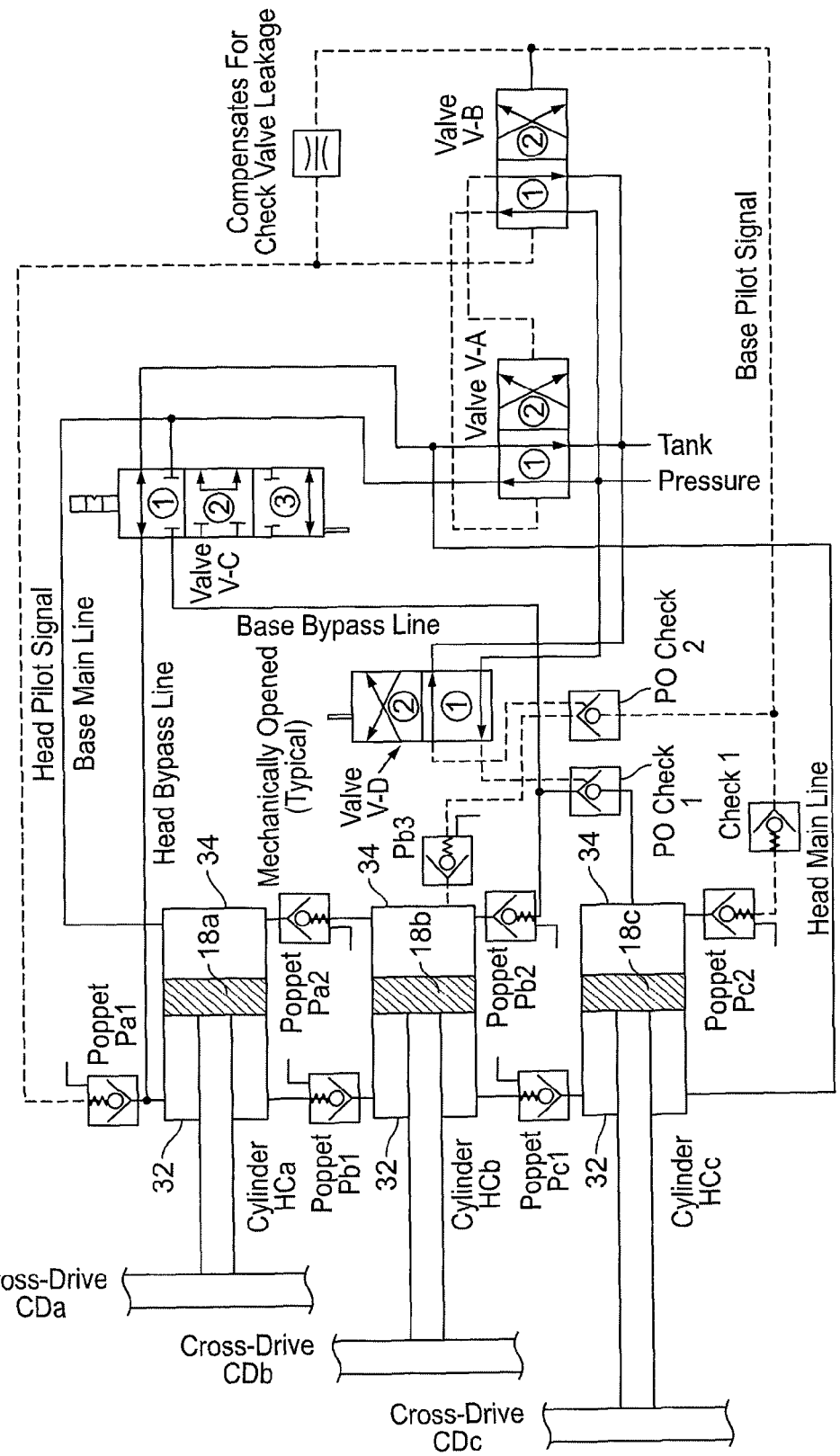
FIG. 22 is a hydraulic schematic of an alternative preferred exemplary adaptable or multi-mode reciprocating slat conveyor that can operate in both a two-step non-continuous operating mode and a three-step continuous operating mode.

FIG. 22 is a hydraulic schematic of an alternative preferred exemplary adaptable or multi-mode reciprocating slat conveyor that can operate in both a two-step non-continuous operating mode and a three-step continuous operating mode. The main difference this adaptable reciprocating slat conveyor and that shown in FIG. 3 is that HCc is held by a check valve instead of routing the input to the pressure line. One advantage to this adaptable reciprocating slat conveyor is that it can use off the shelf components and may be easier to produce. In some cases the check valve may block HCc from moving better than the pressure method. When valve V-D (such as a 4-way valve, such as a DMA-G01-E3X-10 produced by Nachi America, 570 "B" Telser Rd, Lake Zurich, Ill. 60047) is in position (1), PO Check 1 (a normally closed, pilot to open check valve such as a RP16A-01 produced by HYDAC International, 445 Windy Point Dr, Glendale Heights, Ill. 61039) is open allowing free flow from HCc to HCb to allow HCc to fully retract. PO Check 2 (a normally closed, pilot to open check valve such as a RP08A-01 produced by HYDAC International, 445 Windy Point Dr, Glendale Heights, Ill. 61039) is closed preventing the Base Pilot signal from coming from HCb Pb3 and only allowing it to come from HCc Pc2. When valve V-D is in position (2), PO Check 1 is closed blocking HCc from retracting while allowing its extension. PO Check 2 is open allowing Base Pilot signal to come from HCb Pb3. Check 1 prevents oil from leaving HCc through Pc2 into the pilot signal. Like the adaptable reciprocating slat conveyor shown in FIG. 3, this adaptable reciprocating slat conveyor uses a mechanically/electrically/manually operated valve V-D.

As mentioned above, alternative adaptable reciprocating slat conveyors can be implemented using alternative structure. In addition to those alternative adaptable reciprocating slat conveyors discussed above, the adaptable reciprocating slat conveyor may be implemented using high-tech structure. For example, poppets can be replaced with electronic or magnetic Reed switches. Another example is that valves may be replaced with processors and/or computers. For example, valve V-B could be replaced with a processor, logic control unit, or a PLC computer that receives signals and controls valve V-A. Such technology is disclosed in U.S. Pat. No. 5,839,568 to Clark, which is incorporated herein by reference. Further, alternative adaptable reciprocating slat conveyors could be implemented that provide the user with two different operating modes (e.g. a three-step non-continuous operating mode and a four-step continuous operating mode) or more than two operating modes. The operating modes may be known operating modes (e.g. those discussed in the patent references disclosed herein) or operating modes yet to be developed. Still further, the floor slat arrangement may be similar to that described in U.S. Pat. No. 4,856,645 to Hallstrom (the disclosure of which is herein incorporated by reference) that shows the stationary third slat between each moving slat as well as the stationary slat being narrower than the moving slats.

It should be noted that the use of numbers and letters is primarily for purposes of identification and not necessarily as an indication of order.

It should be noted that all publications, patents, and patent applications cited herein, whether supra or infra, are hereby incorporated by reference in their entirety.

The terms and expressions that have been employed in the foregoing specification are used as terms of description and not of limitation, and are not intended to exclude equivalents of the features shown and described. This application is intended to cover any adaptations or variations of the present invention. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention which, as a matter of language, might be said to fall therebetween.

What is claimed is:

1. A multi-operating-mode reciprocating slat conveyor, comprising:
    (a) a plurality of slats arranged in groups, said slats movable in a load-conveying direction and a load-retracting direction;
    (b) at least one power source, one slat of each group attached to said at least one power source;
    (c) a plurality of operating modes, each operating mode having a predetermined number of steps for moving a predetermined number of slats in each group of slats in said load-retracting direction;

(d) at least one of said plurality of operating modes being an initial operating mode;

(e) means for switching to a new operating mode, said means for switching responsive to at least one operating mode changing event;

(f) said multi-operating-mode reciprocating slat conveyor positionable in a load-holding compartment having a front end and a rear end;

(g) said plurality of operating modes including a first operating mode and a second operating mode comprising;

(h) said first operating mode comprising:
  (i) a "loading" state in which slats move simultaneously in the load-conveying direction toward the front end of the load-holding compartment and retract separately in the load-retracting direction toward the rear end of the load-holding compartment;
  (ii) an "unloading" state in which slats move simultaneously in the load-conveying direction toward the rear end of the load-holding compartment and retract separately in the load-retracting direction toward the front end of the load-holding compartment; and
  (iii) said first operating mode being characterized by a first predetermined number of steps for retracting in either the "loading" state or the "unloading" state; and (i) said second operating mode comprising:
  (i) a "loading" state in which slats move simultaneously in the load-conveying direction toward the front end of the load-holding compartment and retract separately in the load-retracting direction toward the rear end of the load-holding compartment;
  (ii) an "unloading" state in which slats move simultaneously in the load-conveying direction toward the rear end of the load-holding compartment and retract separately in the load-retracting direction toward the front end of the load-holding compartment; and
  (iii) said second operating mode being characterized by a second predetermined number of steps for retracting in either the "loading" state or the "unloading" state.

2. The multi-operating-mode reciprocating slat conveyor of claim 1, said at least one power source including a plurality of sub-power units, one slat of each group attached to one of said plurality of sub-power units.

3. The multi-operating-mode reciprocating slat conveyor of claim 1, each said operating mode being continuous or non-continuous.

4. The multi-operating-mode reciprocating slat conveyor of claim 1, wherein said initial operating mode is user selectable.

5. The multi-operating-mode reciprocating slat conveyor of claim 1, wherein said initial operating mode is determined by at least one sensor.

6. The multi-operating-mode reciprocating slat conveyor of claim 1, wherein said means for switching is repeatedly responsive to operating mode changing events.

7. The multi-operating-mode reciprocating slat conveyor of claim 1, wherein at least one operating mode uses a predetermined number of steps equal to the number of slats in each group for moving said slats in each group in said load-retracting direction.

8. The multi-operating-mode reciprocating slat conveyor of claim 1, wherein at least one operating mode uses a predetermined number of steps equal to one less than the number of slats in each group for moving said slats in each group in said load-retracting direction, one of said slats in each group remaining stationary.

9. The multi-operating-mode reciprocating slat conveyor of claim 1, wherein said initial operating mode has a different predetermined number of steps than said new operating mode.

10. The multi-operating-mode reciprocating slat conveyor of claim 1, wherein said means for switching to a new operating mode is selected from the group consisting of:
  (a) mechanical switches;
  (b) electrical switches;
  (c) mechanical valves;
  (d) electrical valves;
  (e) computer or processor logic units;
  (f) mechanical mechanisms;
  (g) disconnection means; and
  (h) combinations of the means for switching set forth in (a)-(g).

11. The multi-operating-mode reciprocating slat conveyor of claim 1, wherein said at least one operating mode changing event is selected from the group consisting of:
  (a) a predetermined selection of an operating mode;
  (b) a manual operating mode changing event;
  (c) a sensor operating mode changing event;
  (d) a timing operating mode changing event;
  (e) a counting mode changing event (number of cycles); and
  (f) a combination of (a)-(e).

12. The multi-operating-mode reciprocating slat conveyor of claim 1, wherein said first predetermined number of steps in said first operating mode is a different number than said second predetermined number of steps in said second operating mode.

13. A multi-operating-mode reciprocating slat conveyor for loading and unloading at least one load from a load-holding compartment, comprising:

(a) a plurality of slats arranged in groups of n slats, said slats movable in a load-conveying direction and a load-retracting direction, wherein n is a number greater than or equal to three (3);

(b) n power sources, one slat of each group attached to each power source;

(c) a plurality of operating modes, each operating mode having a predetermined number of steps for moving a predetermined number of slats in each group of slats in said load-retracting direction;

(d) means for switching between operating modes, said means for switching responsive to at least one operating mode changing event;

(e) said multi-operating-mode reciprocating slat conveyor positionable in a load-holding compartment having a front end and a rear end;

(f) said plurality of operating modes including a first operating mode and a second operating mode comprising;

(g) said first operating mode comprising:
  (i) a "loading" state in which slats move simultaneously in the load-conveying direction toward the front end of the load-holding compartment and retract separately in the load-retracting direction toward the rear end of the load-holding compartment;
  (ii) an "unloading" state in which slats move simultaneously in the load-conveying direction toward the rear end of the load-holding compartment and retract separately in the load-retracting direction toward the front end of the load-holding compartment; and
  (iii) said first operating mode being characterized by a first predetermined number of steps for retracting in either the "loading" state or the "unloading" state; and (h) said second operating mode comprising:
  (i) a "loading" state in which slats move simultaneously in the load-conveying direction toward the front end of the load-holding compartment and retract separately in the load-retracting direction toward the rear end of the load-holding compartment;
  (ii) an "unloading" state in which slats move simultaneously in the load-conveying direction toward the rear end of the load-holding compartment and retract separately in the load-retracting direction toward the front end of the load-holding compartment; and
  (iii) said second operating mode being characterized by a second predetermined number of steps for retracting in either the "loading" state or the "unloading" state.

14. The multi-operating-mode reciprocating slat conveyor of claim 13, said n power sources being n sub-power units of a single power unit.

15. The multi-operating-mode reciprocating slat conveyor of claim 13, each said operating mode being continuous or non-continuous.

16. The multi-operating-mode reciprocating slat conveyor of claim 13, said at least one operating mode changing event is selected from the group consisting of:
  (a) a predetermined selection of an operating mode;
  (b) a manual operating mode changing event;
  (c) a sensor operating mode changing event;
  (d) a timing operating mode changing event;
  (e) a counting mode changing event (number of cycles); and
  (f) a combination of (a)-(e).

17. The multi-operating-mode reciprocating slat conveyor of claim 13, wherein said means for switching is repeatedly responsive to operating mode changing events.

18. The multi-operating-mode reciprocating slat conveyor of claim 13, wherein at least one operating mode uses n steps for moving said slats in said load-retracting direction.

19. The multi-operating-mode reciprocating slat conveyor of claim 13, wherein at least one operating mode uses n–1 steps for moving said slats in said load-retracting direction, one of said slats in each group remaining stationary.

20. The multi-operating-mode reciprocating slat conveyor of claim 13, wherein said means for switching to a new operating mode is selected from the group consisting of:
  (a) mechanical switches;
  (b) electrical switches;
  (c) mechanical valves;
  (d) electrical valves;
  (e) computer or processor logic units;
  (f) mechanical mechanisms;
  (g) disconnection means; and
  (h) combinations of the means for switching set forth in (a)-(g).

21. The multi-operating-mode reciprocating slat conveyor of claim 13, wherein said plurality of operating modes comprises at least an initial operating mode and a new operating mode, said initial operating mode having a different predetermined number of steps than said new operating mode.

22. The multi-operating-mode reciprocating slat conveyor of claim 13, wherein said first predetermined number of steps in said first operating mode is a different number than said second predetermined number of steps in said second operating mode.

23. A multi-operating-mode reciprocating slat conveyor, said multi-operating-mode reciprocating slat conveyor positionable in a load-holding compartment having a front end and a rear end, said conveyor comprising:
  (a) a plurality of slats arranged in groups, said slats movable in a load-conveying direction and a load-retracting direction;
  (b) at least one power source, one slat of each group attached to said at least one power source;
  (c) at least two operating modes, each operating mode having a predetermined number of steps for moving a predetermined number of slats in each group of slats in said load-retracting direction;
    (i) a first operating mode comprising:
      (A) a "loading" state in which slats move simultaneously in the load-conveying direction toward the front end of the load-holding compartment and retract separately in the load-retracting direction toward the rear end of the load-holding compartment;
      (B) an "unloading" state in which slats move simultaneously in the load-conveying direction toward the rear end of the load-holding compartment and retract separately in the load-retracting direction toward the front end of the load-holding compartment; and
      (C) said first operating mode being characterized by a first predetermined number of steps equal to the number of slats in each group for retracting in either the "loading" state or the "unloading" state; and
    (ii) a second operating mode comprising:
      (A) a "loading" state in which slats move simultaneously in the load-conveying direction toward the front end of the load-holding compartment and retract separately in the load-retracting direction toward the rear end of the load-holding compartment;
      (B) an "unloading" state in which slats move simultaneously in the load-conveying direction toward the rear end of the load-holding compartment and retract separately in the load-retracting direction toward the front end of the load-holding compartment; and
      (C) said second operating mode being characterized by a second predetermined number of steps equal to one less than the number of slats in each group for retracting in either the "loading" state or the "unloading" state;
  (d) at least one of said plurality of operating modes being an initial operating mode; and
  (e) means for switching to a new operating mode, said means for switching responsive to at least one operating mode changing event.

24. A method of conveying a load on a multi-operating-mode reciprocating slat conveyor in a load-holding compartment having a front end and a rear end, the method comprising:
  (a) providing a conveyor having at least three sets of slats, the slats within each set joined together for simultaneous reciprocative movement in both a load-conveying direction and a load-retracting direction, the slats arranged in a plurality of groups, each group comprising at least one correspondingly positioned slat within each set such that each group has correspondingly positioned slats within each set;
  (b) providing at least one drive means attached to the sets; and
  (c) selectively controlling said drive means to sequentially move the sets in a first series of steps in a first operating mode:

(i) said first series of steps in said first operating mode having "loading" state in which slats move simultaneously in the load-conveying direction toward the front end of the load-holding compartment and retract separately in the load-retracting direction toward the rear end of the load-holding compartment;

(ii) said first series of steps in said first operating mode having an "unloading" state in which slats move simultaneously in the load-conveying direction toward the rear end of the load-holding compartment and retract separately in the load-retracting direction toward the front end of the load-holding compartment; and (iii) said first operating mode being characterized by a first predetermined number of steps for retracting in either the "loading" state or the "unloading" state; and (d) selectively controlling said drive means to sequentially move the sets in a second series of steps in a second operating mode:

(i) said second series of steps in said second operating mode having "loading" state in which slats move simultaneously in the load-conveying direction toward the front end of the load-holding compartment and retract separately in the load-retracting direction toward the rear end of the load-holding compartment;

(ii) said second series of steps in said second operating mode having an "unloading" state in which slats move simultaneously in the load-conveying direction toward the rear end of the load-holding compartment and retract separately in the load-retracting direction toward the front end of the load-holding compartment; and (iii) said second operating mode being characterized by a second predetermined number of steps for retracting in either the "loading" state or the "unloading" state.

25. The method of claim 24 further comprising the step of switching between said first operating mode and said second operating mode in response to at least one operating mode changing event.

26. The method of claim 24 further comprising the step of switching between operating modes in response to at least one operating mode changing event selected from a group consisting of:
(a) a predetermined selection of an operating mode;
(b) a manual input;
(c) a sensor output;
(d) an end of a predetermined time period; and
(e) a completion of a predetermined number of cycles of a sequence of operation.

27. The method of claim 24 further comprising the step of switching between operating modes in response to the sensing one or more factors selected from a group consisting of:
(a) the weight of the load;
(b) the height of the load;
(c) the position of the load;
(d) the motion of the load;
(e) the mass of the load; and
(f) the system pressure system.

28. The method of claim 24 further comprising the step of selecting said first operating mode or said second operating mode to be an initial operating mode.

29. The method of claim 24 further comprising the step of selectively controlling said drive means such that said predetermined number of steps for at least one operating mode is equal to the number of slats in each group.

30. The method of claim 24 further comprising the step of selectively controlling said drive means such that the predetermined number of steps for at least one operating mode is at least one less than the number of slats in each group, and wherein at least one of said slats in each group remains stationary.

31. The method of claim 24 further comprising the step of selectively controlling said drive means such that said first predetermined number of steps for said first operating mode is different from said second predetermined number of steps for said second operating mode.

* * * * *